(12) United States Patent
Siomina et al.

(10) Patent No.: US 9,451,575 B2
(45) Date of Patent: Sep. 20, 2016

(54) POSITIONING DEVICES AND METHODS IN CELLULAR COMMUNICATION SYSTEMS

(75) Inventors: Iana Siomina, Solna (SE); Torbjörn Wigren, Uppsala (SE)

(73) Assignee: TELEFONAKTIEBOLAGET L M. ERICSSON, Stockholm (SE)

( * ) Notice: Subject to any disclaimer, the term of this patent is extended or adjusted under 35 U.S.C. 154(b) by 655 days.

(21) Appl. No.: 13/321,211

(22) PCT Filed: Oct. 25, 2011

(86) PCT No.: PCT/SE2011/051263
§ 371 (c)(1),
(2), (4) Date: Nov. 18, 2011

(87) PCT Pub. No.: WO2012/115557
PCT Pub. Date: Aug. 30, 2012

(65) Prior Publication Data
US 2012/0214512 A1 Aug. 23, 2012

Related U.S. Application Data

(60) Provisional application No. 61/446,119, filed on Feb. 22, 2011.

(51) Int. Cl.
*H04W 24/00* (2009.01)
*H04W 64/00* (2009.01)
(Continued)

(52) U.S. Cl.
CPC ............ *H04W 64/00* (2013.01); *G01S 5/0205* (2013.01); *G01S 5/06* (2013.01); *H04W 8/22* (2013.01); *H04W 24/10* (2013.01); *H04W 28/048* (2013.01)

(58) Field of Classification Search
CPC ... H04W 24/00; H04W 64/00; H04W 24/10; H04W 8/22; H04W 28/048; G01S 5/0205; G01S 5/06
USPC .................... 455/456.1, 456.2, 453, 438, 525
See application file for complete search history.

(56) References Cited

U.S. PATENT DOCUMENTS 8,879,485 B2* 11/2014 Chun .................. H04W 72/042
370/329
2004/0132466 A1 7/2004 Kennedy, Jr.
(Continued)

FOREIGN PATENT DOCUMENTS

WO 2007013850 A2 2/2007
WO 2007043915 A1 4/2007
(Continued)

OTHER PUBLICATIONS

3GPP TSG-RAN WG3#69 bis "Call Flow to Support U-TDOA"—Xi'an, China Oct. 11-15, 2010—TruePosition.*
(Continued)

*Primary Examiner* — Mong-Thuy Tran
(74) *Attorney, Agent, or Firm* — Patents on Demand P.A.; Brian K. Buchheit; Scott M. Garrett

(57) ABSTRACT

A method, performed in a positioning node, for performing uplink positioning comprises receiving (210) of a request for uplink positioning of a user equipment. Information about carrier capabilities for uplink positioning measurements for carriers used in a serving cell of the user equipment is obtained (220). The method further comprises deciding (230) of which carrier to be used for uplink positioning measurements, based at least on the information about carrier capabilities. An uplink positioning measurement request for the user equipment using the carrier decided to be used for uplink positioning measurements is transmitted (250). Data representing said requested uplink positioning measurements is received (252). Complementing methods of cooperating network nodes are also disclosed as well as arrangements of the nodes.

47 Claims, 10 Drawing Sheets

(51) Int. Cl.
*G01S 5/02* (2010.01)
*G01S 5/06* (2006.01)
*H04W 8/22* (2009.01)
*H04W 24/10* (2009.01)
*H04W 28/04* (2009.01)

(56) References Cited

U.S. PATENT DOCUMENTS

| | | | |
|---|---|---|---|
| 2006/0234638 A1* | 10/2006 | Mueckenheim et al. | 455/67.11 |
| 2009/0143065 A1* | 6/2009 | Mattila | 455/423 |
| 2009/0245207 A1* | 10/2009 | Rao | 370/332 |
| 2009/0323596 A1* | 12/2009 | Wigren et al. | 370/329 |
| 2010/0091667 A1* | 4/2010 | Kazmi et al. | 370/252 |
| 2010/0118810 A1* | 5/2010 | Qu | H04L 5/0007 370/329 |
| 2010/0120394 A1* | 5/2010 | Mia et al. | 455/404.2 |
| 2010/0166112 A1* | 7/2010 | Drennen, III | 375/316 |
| 2010/0203899 A1* | 8/2010 | Sheynblat et al. | 455/456.1 |
| 2010/0238857 A1* | 9/2010 | Zhang et al. | 370/328 |
| 2010/0240396 A1* | 9/2010 | Zhang et al. | 455/456.1 |
| 2010/0323720 A1* | 12/2010 | Jen | 455/456.1 |
| 2011/0201334 A1* | 8/2011 | Rosenqvist et al. | 455/436 |
| 2012/0008575 A1* | 1/2012 | Vujcic | H04W 74/002 370/329 |
| 2012/0020320 A1* | 1/2012 | Issakov et al. | 370/330 |

FOREIGN PATENT DOCUMENTS

| | | |
|---|---|---|
| WO | 2008039123 A1 | 4/2008 |
| WO | 2010144004 A1 | 12/2010 |

OTHER PUBLICATIONS

3GPP. "Call flow to Support U-TDOA." 3GPP TSG-RAN WG3 #69bis, Oct. 11-15, 2010, Xi'an, China. R3-103050.
3GPP. "Consideration on UE RF capability in CA." 3GPP TSG-RAN WG4 Meeting Ad Hoc 2010, #3. Jun. 28-Jul. 2, 2010, Bratislava, Slovakia. R4-102608.
3GPP. "UE frequency capability for LPP." 3GPP TSG-RAN WG2 Meeting #72, Nov. 15-19, 2010, Jacksonville, FL. R2-106695.
3GPP. "Stage 2 functional specification of User Equipment (UE) positioning in E-UTRAN (Release 10)" 3GPP TS 36.305 V10.0.0. Dec. 2010. 3GPP, Valbonne Sophia-Antipolis, France.
3GPP. "Remaining Open Items on UTDOA Positioning" 3GPP TSG-RAN WG1 Meeting #58bis, Oct. 12-16, 2009, Miyazaki, Japan. R1-093857.
3GPP. "Results for UTDOA Positioning Simulations" 3GPP TSG-RAN WG1 #58, Aug. 24-28, 2009, Shenzhen, China. R1-092998.
Wigren, T., "Soft uplink load estimation in WCDMA." IEEE Transactions on Vehicular Technology, vol. 58, No. 2, Feb. 2009.
Dahlman, E., et al., 3G Evolution: HSPA and LTE for mobile broadband. Section 5.1. Academic Press, 2008. 2nd ed. ISBN 978-012374538-5. Elsevier Ltd.
Holma, H., et al., WCDMA for UMTS—Radio Access for Third Generation Mobile Communications. pp. 173-194. Wiley, Chichester, UK. 2010.

\* cited by examiner

POSITIONING DEVICES AND METHODS IN CELLULAR COMMUNICATION SYSTEMS

TECHNICAL FIELD

The present invention relates in general to positioning in cellular communication systems and in particular to positioning devices and methods associated with measurements on uplink radio signals.

BACKGROUND

Positioning possibilities within wireless communication networks play an important role in modern communication systems and will probably be even more exploited in future development. Applications, such as emergency call positioning, position-supported services etc. now form a compulsory part of any modern cellular communication system. Many different kinds of information available in different nodes can be utilized for positioning purposes. In order to be able to perform position determinations, positioning information of different types has to be communicated between different nodes in a communication system as well as different types of instructions and orders. The reporting procedures for positioning-related information therefore also play an important role in the communication systems.

Many different positioning approaches are used today. Cell ID positioning is based on the geometrical area of a cell in which a User Equipment (UE) is situated. In Round Trip Time (RTT) positioning, the time of a radio signal to travel forth and back between a base station and a UE is measured and a distance between the base station and the UE can be computed. In Observed Time Difference Of Arrival (OT-DOA), time differences between signals from a multiple of transmit points are used for triangulation purposes. In positioning with an Assisted Global Positioning System (A-GPS), which is an enhancement of the Global Positioning System (GPS), GPS receivers in terminals connected to the cellular communication system, enhance the performance of the GPS UE receivers. The Adaptive Enhanced Cell-ID (AECID) method is an enhanced fingerprinting positioning method, where databases with collected high precision positions associated with a number of radio properties, cell IDs, RTT measurements and/or received signal strengths, are used for positioning purposes. A-UPS can by advantage be used for determine such high precision positions. However, A-UPS has a limited availability indoors.

Another method that can serve for achieving a high-precision positioning measurement is Uplink Time Difference Of Arrival (UTDOA) positioning. A multiple of receiving points at different locations, typically Radio Base Stations (RBS) or Location Measurement Units (LMU), receive the same radio signal. By combining differences in arrival times, a relatively precise position may be determined.

The UTDOA method belongs to the set of high precision methods. The inaccuracy is, however, significantly larger than that of A-GPS. The main advantage of UTDOA is that it provides high precision positioning also indoors, a situation where the availability of A-GPS is very limited.

To perform UTDOA timing measurements also on user data, to increase the signal to noise ratio, one reference receiver de-codes the UE signals, and forwards the sequence to cooperating receivers. This procedure is relatively complex and requires a significant amount of signaling. The cooperating receivers are normally located in dedicated hardware close to the positioning node. The decoded reference sequence is used in order to regenerate the transmitted sequence from the UE to allow correlation against each forwarded received set of data from the involved receivers in different locations (typically RBS locations).

The main problem with all terrestrial time difference of arrival positioning methods is to detect/be detected in a sufficient number of non-co-located locations. In the case of UTDOA, the problem consists of detection of the same UE transmission in a sufficient number of RBSs base stations (assuming that UTDOA timing measurements are performed in connection to RBSs). This is in general a difficult problem since it requires a sufficiently high signal-to-noise ratio in a number of locations, sometimes far away from the UE. It needs to be noted that the theoretical minimum of three neighbor locations is typically not enough in practice in many situations the number of neighbors may be twice this figure to obtain a reliable performance.

Similar requirements and problems are also present in other types of uplink positioning measurements, such as Time Of Arrival (TOA), Time Difference Of Arrival (TDOA) or signal strength measurements.

In many modern cellular communication systems of today, different carriers are available in one and the same cell. In Wideband Code Division Multiple Access (WCDMA) systems, the Universal mobile telecommunication system Terrestrial Radio Access Network (UTRAN) may redirect the UE to another frequency. The UE autonomously selects a carrier, in 3GPP specifications referred to as "cell reselection", and signals the selected carrier according to a specified "cell update" procedure.

Dual-Carrier High-Speed Downlink Packet Access (DC-HSDPA) was introduced within the 3rd Generation Partnership Project (3GPP) Rel-8. DC-HSDPA enables reception of data from two cells simultaneously, transmitted on two adjacent carriers in the same radio base station and sector, to individual terminals or UE. The concept of DC-HSDPA is in 3GPP Rel-10, extended to 4 downlink carrier frequencies (known as 4C-HSDPA).

To complement DC-HSDPA, in 3GPP Rel-9, Dual-Carrier High-Speed Uplink Packet Access (DC-HSUPA) was also introduced. DC-HSUPA enables an individual terminal to transmit data on two adjacent carrier frequencies simultaneously to the radio access network. DC-HSUPA according to 3GPP Rel-9 is in essence an aggregation of legacy (Rel-8, single-carrier) HSUPA.

The following problems with prior art technology can be noted for uplink positioning. Note also that Long-Term Evolution (LTE) uplink positioning, and in particular UTDOA, has not even been standardized yet. In case several carriers are available in an RBS, it is not known in the positioning node, e.g. situated in a Radio Network Controller (RNC) or a Stand-Alone Serving Mobile Location Centre (SAS) node, on which carrier, if any, uplink measurement reference and slave receivers are available for. Note that uplink positioning measurements are normally performed in separate hardware. Therefore it is not evident for which carriers this is possible. In general, more carriers results in a more expensive radio. In one example, single-carrier measurement units e.g. LMUs), which are either configured for the single-carrier operation on a certain carrier or simply do not support multi-carrier operation mode, may operate in a multi-carrier network. The positioning nodes have today no possibilities to influence which uplink carrier to be used by the UE.

The uplink positioning requires as mentioned above that a sufficiently high signal-to-noise ratio is available at a sufficient number of detection locations. The reference receiver must be able to detect and possibly decode, e.g. for further regeneration, the measurement signal with a very high likelihood. In case more than one carrier is possible to use, one or several carriers may have sufficient signal-to-noise ratios for enabling uplink positioning, while one or several carriers may have to noisy conditions. Today, there are no possibilities for the positioning node to judge which carriers are at all useful and which are not.

SUMMARY

An object of the present invention is to improve the possibilities to perform uplink positioning in a successful manner. This object is achieved by nodes and methods according to the enclosed independent claims. Preferred embodiments are defined by enclosed dependent claims. In general words, in a first aspect, a method, performed in a positioning node, for performing uplink positioning comprises receiving of a request for uplink positioning of a user equipment. Information about carrier capabilities for uplink positioning measurements for the user equipment is obtained. The method further comprises deciding of which carrier to be used for uplink positioning measurements, based at least on the information about carrier capabilities. An uplink positioning measurement request for the user equipment using the carrier decided to be used for uplink positioning measurements is transmitted. Data representing said requested uplink positioning measurements is received.

In a second aspect, a method, performed in a node of a radio network subsystem, for assisting in uplink positioning comprises receiving, from a positioning node, a triggering request for enabling a user equipment to utilize a carrier for uplink communication. The carrier is a carrier decided to be used for uplink positioning measurements. An order for enabling the user equipment to utilize a carrier for uplink communication is provided as a response to the triggering request.

In a third aspect, a method, performed in a radio base station, for assisting in uplink positioning comprises estimating of a respective load of radio interface on carriers configured for communication with user equipments. The respective loads are reported to a positioning node.

In a fourth aspect, a method, performed in a location measurement unit, for assisting in uplink positioning comprises reporting, to a positioning node, which carriers that are supported or available for uplink positioning measurements. Uplink positioning measurement requests are received. The uplink positioning measurements are performed and uplink positioning measurement reports are transmitted.

In a fifth aspect, a positioning node comprises a receiver, a transmitter, a capability collector and a processor. The receiver is configured for receiving a request for uplink positioning of a user equipment. The capability collector is configured for obtaining information about carrier capabilities for uplink positioning measurements for carriers used in a serving cell of the user equipment. The processor is connected to the receiver and the capability collector. The processor is configured for deciding which carrier to be used for uplink positioning measurements, based at least on the information about carrier capabilities. The transmitter is connected to the processor. The transmitter is configured for transmitting an uplink positioning measurement request for the user equipment using the carrier decided to be used for uplink measurements. The receiver is further configured for receiving data representing the requested uplink positioning measurements.

In a sixth aspect, a radio base station comprises an antenna, a load estimator and a transmitter. The antenna is configured for communication with user equipments. The load estimator is configured to estimate a respective load of radio signaling on the at least two carriers. The transmitter is connected to the load estimator. The transmitter is configured for reporting the respective loads to a positioning node.

In a seventh, aspect, a location measurement unit comprises an antenna, a measurement unit and a communication unit. The antenna is configured for reception of radio signals. The measurement unit is connected to the antenna. The measurement unit is configured for uplink positioning measurements on the radio signals. The communication unit is connected to the measurement unit. The communication unit is configured for receiving uplink positioning measurement requests and for transmitting uplink positioning measurement reports. The communication unit is further configured for reporting which carriers that are supported or available for uplink positioning measurements, to a positioning node.

In an eight aspect, a node of a radio network subsystem comprises a carrier selector, configured for providing an order for enabling a user equipment to utilize a carrier for uplink communication with a radio base station. The carrier selector is further configured for receiving, from a positioning node, a triggering request for enabling a user equipment to utilize a carrier for uplink communication. This carrier is a carrier decided to be used for uplink positioning measurements. The carrier selector is further configured for providing the order for enabling the user equipment to utilize the carrier for uplink communication as a response on a received said triggering request.

In a ninth aspect, a cellular communication system comprises at least one positioning node according to the fifth aspect and at least one node according to any of the sixth, seventh or eighths aspects.

One advantage with the present invention is that it enables an efficient utilization of existing carriers for uplink positioning measurements. Further advantages are discussed in connection with the different embodiments described further below.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

In the particular embodiments presented in the detailed description, the model cellular communication system used is a WCDMA system. However, the principles of the present invention are also applicable in other cellular communication systems, such as e.g. LTE. The reason for using WCDMA as a model system is that UTDOA has not yet been standardized in LTE, which means that there are not yet any accepted technical terms for many of the components in the implementation of UTDOA in LTE. However, there are no difficulties to transfer the present ideas from a WCDMA based system into an LTE system. In the case of LTE, the RBS corresponds typically to a eNode B, most of the positioning functionality of the RNC is taken care of by the Enhanced Serving Mobile Location Center (E-SMLC) or Secure User Plane Location (SUPL) Location Platform (SLP), although UE handover and carrier switching is typically an eNodeB decision. Generalizations are discussed further below.

Figure 1:
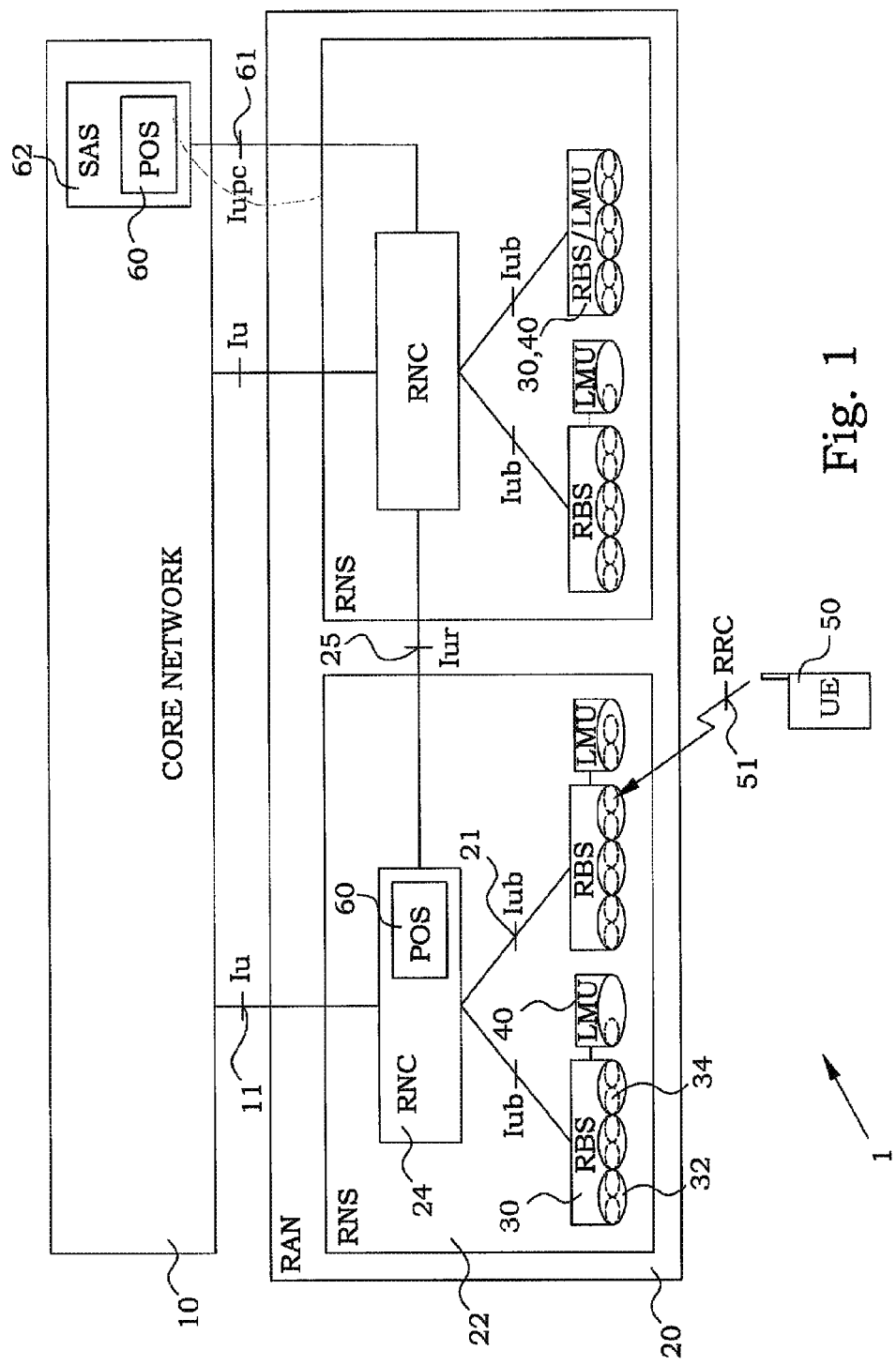
FIG. 1 is a schematic illustration of a WCDMA communication system.

A typical architecture of a WCDMA system is illustrated in FIG. 1. This will be used as a model system for introducing the assumed network architecture and some fundamental issues. The cellular communication system 1, in the present embodiment a WCDMA system, comprises a Core Network (CN) 10 of the operator. The CN 10 provides connections to other networks as well as many other functionalities. A UE 50 is the mobile terminal by which a subscriber can access services offered by the operator's CN 10. A Radio Access Network (RAN) 20 is a part of the cellular communication system 1 that is responsible for the radio transmission and control of the radio connection. The RAN 20 comprises a number of Radio Network Subsystems (RNS) 22. The RNS 22 controls a number of Radio Base Stations (RBS) 30 in the RAN 20. The RBS 30 handles the radio transmission and reception within one or more cells. A Radio Network Controller (RNC) 24 controls radio resources and radio connectivity within a set of cells 32. A cell 32 covers a certain geographical area, but is in the figure only illustrated schematically. The radio coverage in a cell is provided by RBS 30 equipment at the RBS site. Each cell is identified by a unique identity, which is broadcast in the cell. There may be more than one cell 32 covering the same geographical area. The radio connectivity within a cell 32 is provided by one or several carriers 34. The carriers 34 are in WCDMA typically different frequency bands.

A Radio Link is a representation of the communication between a UE 50 and one cell in the RAN 22. In a WCDMA system, the control signaling over the radio link uses a Radio Resource Control (RRC) interface 51. Other interfaces are connecting the different nodes in the RAN 20. An Iub interface 21 is used between the RBS and the RNC within a RNS 22. An Iur interface 25 controls the communication between RNCs 24 of different RNSs 22. User data is transported on so-called transport bearers on these interfaces. Dependent on the transport network used, these transport bearers could e.g. be mapped to AAL2 connections, in case of an ATM based transport network, or UDP connections, in case of an IP based transport network. An Iu interface 11 connects the CN 10 and the RANs 20.

In 3GPP Release 99, a retransmission scheme of the Dedicated CHannels (DCH) is part of the Radio Link Control (RLC) protocol layer, which terminates in the UE 50 and the RNC 24. When High Speed Downlink Packet Access (HSDPA) was introduced, some control functions were relocated from the RNC 24 to the RBS 30. These include e.g. fast retransmissions in the Media Access Control (MAC) layer from the RBS 30 when transmissions fail. Also an Enhanced UpLink (EUL) has been introduced in WCDMA with similar retransmission mechanisms in MAC. The collective term High Speed. Packet Access (HSPA) is often used for the combination of HSDPA and EUL.

A retransmission scheme with both error correction and error detection is referred to as hybrid ARQ. Error corrections are enabled by combining information from both the first transmission of a data block and from subsequent retransmissions of the same data block. Furthermore, it is also possible to consider transmitting additional coded bits instead of repeating the same data block during a retransmission. To make processing and signaling more efficient, several data blocks are handled in parallel. While data block i is processed, decoding information is fed back to the transmitter.

In the 3GPP standard, two positioning architectures in the RAN for control plane positioning are available. User plane UTDOA positioning is not possible since the UTDOA measurement is not available in the UE.

A first positioning architecture is called an RNC centric architecture. This RNC centric architecture is illustrated in the left RNS in FIG. 1. The RNC 24 is here the node where most of the positioning functionality is located, i.e. a positioning node 60 can be considered as being a part of the RNC 24. The positioning node 60 of the RNC 24 receives positioning requests from the CN 10 over the Iu interface 11. The positioning node 60 of the RNC 24 determines which positioning method to use to serve the request. The positioning node 60 of the RNC 24 also orders measurements to be performed by the RBS 30, the UE 50 or any other node having functionalities for performing positioning measurements. The RBS 30 can perform certain positioning related measurements, e.g. like Round Trip Time (RTT) measurements. The UE 50 may also perform certain positioning related measurements, e.g. like the UE RxTx measurement. For uplink positioning measurements dedicated Location Measurement Units (LMU) 40 are often used. These LMUs 40 can be separate units, co-located or non-co-located with the RBS 30, sharing or not sharing antennas with radio base stations. The LMUs can also be incorporated, in the RBS 30, as illustrated, in the right part of FIG. 1. The positioning node 60 of the RNC 24 furthermore typically computes the location of the UE 50, and reports the result back to the CN 10.

A second positioning architecture is called an SAS centric architecture. This SAS centric architecture is illustrated in the right RNS in FIG. 1. In this architecture most of the positioning functionality is taken over by a broken out SAS node 62, leaving the RNC 24 as a measurement and positioning reporting relay node. A positioning node 60 can now be considered as being a part of the SAS 62. Otherwise the functionality is the same. The RNC 24 and the SAS 62 communicated over an Iupc interface 61.

A RAN 20, being configured for performing uplink positioning thus typically comprises at least one positioning node 60, at least one node being able to perform uplink measurements, i.e. a RBS 30 or LMU 40 and a node, RNC 24 for at least reporting purposes.

In systems where more than one carrier may be available in a cell, different types of carrier selections are typically provided for. In a WCDMA system, the CELL_FACH takes care of such cell-related issues. In CELL_FACH, the UTRAN may redirect the UE to another frequency.

A cell selection or reselection can also be initiated by the UE. When being in the CELL_FACH state, the UE may autonomously select a carrier, in 3GPP specifications referred to as a cell reselection, and signals the selected carrier according to a specified "cell update" procedure. TS 25.331, "Radio Resource Control (RRC) presents the details of such procedures. The cell reselection is essentially based on measurements of downlink signal quality of the common pilot channel (CPICH), which is broadcasted in each cell with a constant transmit power. More specifically, there are two options for quality metrics. A first one is energy per chip divided by the total received non-orthogonal interference power (Ec/N0) of the Common Pilot CHannel (CPICH). The other is Received Signal Code Power (RSCP, i.e. signal strength) of the CPICH. Which metric to employ is decided by the network and signaled on the broadcast channel (BCH). The cell (re)-selection applies both to cells on the same carrier frequency, but also on other carrier frequencies.

As specified in 3GPP TS 25.304, "User Equipment (UE) procedures in idle mode and procedures for cell reselection in connected mode", the ranking of each cell is given by:

$$R_s = Q_{meas,s} + Qhyst_s \text{ for the current cell,}$$

and $$R_n = Q_{meas,n} - Qoffset_{s,n} \text{ for the neighboring intra/inter-frequency cells.}$$

Observe that $Qoffset_{s,n}$ is an offset for the pair of cells and $Qhyst_s$ is a hysteresis margin employed for the current cell. There are also other parameters involved, e.g. for priorities between cell layers which is useful for hierarchical cell structures, that are omitted here for the sake of clarity.

As mentioned in the background, DC-HSUPA enables use of more than one carrier at the same time. Although the additional spectrum bandwidth associated with multi-carrier operation does not increase "spectral efficiency", i.e. maximum achievable throughput per cell per Hz [bps/cell/Hz], the experienced user data rates are increased significantly. In particular, for bursty packet data traffic at low and moderate load, the data rate is proportional to the number of carriers exploited. Moreover, power inefficient higher order modulation schemes can be avoided, which is especially important in the uplink, and the practical as well as theoretical peak data rate of the system are naturally increased.

In the discussion below the focus will be on the case of DC-HSUPA and 4C-HSDPA using contiguous carrier frequencies. However, all concepts are readily extendable to Multi-Carrier HSUPA (MC-HSUPA) operation over more than two uplink carriers, and system configurations wherein the carrier frequencies employed for the respective link direction are non-contiguous, e.g., located in different frequency bands.

Handover and radio access bearer admission control is presumed to be conducted in the RNC based on measurements of path loss etc on a primary carrier, alternatively referred to as an anchor carrier. Notice though, that in case of a distributed RAN architecture where RBS and RNC functionality as defined in 3GPP specifications are collocated in a base station, the base station would naturally handle also these functionalities. In a DC-HSUPA capable RBS, the other carrier, which is referred to as a secondary carrier, is assumed to be configured by the RNC for a given DC-HSUPA capable UE and then scheduled and activated by the RBS whenever feasible and useful, with the standard objective function to maximize the supported traffic volumes, or aggregate system throughput, subject to fairness criteria and quality of service constraints, such as minimum bit rate or maximum latency requirements, in other words, the RBS enables the UE to utilize the carrier. A primary carrier, on the other hand, may not be temporarily deactivated by the RBS. To deactivate a certain primary carrier for a connection, the connection is either released, or an inter-frequency handover is performed, in which case another carrier will become the primary carrier.

For each user connected in DC-HSUPA mode, the serving RBS hence controls whether or not a secondary carrier is activated, and a separate grant is selected for each activated carrier.

Furthermore, if a secondary carrier is activated by the RBS, it is assumed that the Dedicated Physical Control CHannel (DPCCH), which includes a sequence of pilot bits, is transmitted on that carrier, and the RBS hence tries to detect this signal.

In a future system, one can envisage multi-carrier operations in the CELL_FACH state. A natural extension would then be to introduce a RBS controlled carrier selection of the uplink transmissions and this will be presumed in certain embodiments of the present invention.

In cellular communication systems, there is a multitude of positioning methods available. A few examples of basic considerations of such positioning methods are presented in Appendix A.

As briefly discussed in the background section, when several carriers are available in an RBS, it cannot be assumed that uplink measurements for positioning purposes really can be performed utilizing uplink signals of that specific carrier that the UE in question presently uses. In case several carriers are available in an RBS, it is not generally known in the positioning node, typically in the RNC or SAS, on which carrier, if any, uplink positioning measuring nodes, e.g. UTDOA reference and slave receivers are available for. Note that UTDOA radio measurements are normally performed in separate HW, therefore it is not evident for which carriers this is possible. In general, more carriers results in a more expensive radio. In one example, single-carrier measurement units, e.g. LMUs, which are either configured for the single-carrier operation on a certain carrier or simply do not support multi-carrier operation mode, may operate in a multi-carrier network. A similar problem occurs in general when there is a mix of nodes (RBS, LMU, etc.) supporting not identical sets of frequencies. One task is therefore to make such information available for the positioning node. If such information is present in the positioning node, an order of an uplink positioning measurement trying to use a non-available carrier can be avoided. Even better would be to have the possibility for the positioning node to influence the choice of carrier for the UE. The positioning nodes have today no possibilities to influence which carrier to be used. More particularly, today there is no functionality for the positioning node even to trigger a switch to a carrier where uplink positioning measurements, e.g. UTDOA, can be made, if needed.

Furthermore, uplink positioning typically requires detection at a sufficient number of detection locations. Today, there are no possibilities for the positioning node to check the conditions of the carriers for deciding which ones are possible to use for uplink positioning purposes. Having such information, the positioning node would be able to make even better choices of carrier to be used for uplink positioning measurements. The positioning node may then avoid issuing positioning measurement orders on carriers that at least temporarily are useless for positioning purposes. Such carrier conditions will also change with time, which means that fairly recent determinations of usefulness have to be available for the positioning node.

Furthermore, in case more than one carrier is possible to use, the carrier where it is most likely to detect the uplink signal in most measurement locations is typically to prefer. The reference receiver must in many cases also be able to detect and possibly decode, e.g. for further regeneration, the measurement signal with a very high likelihood. This means that the carrier with the most beneficial configuration, e.g. regarding bandwidth or interference situation, according to the above two criteria may need to be selected for uplink positioning measurements, e.g. UTDOA measurements. There is, however, no signaling available that allows the load, of all cells/carriers adjacent to a given cell, to be signaled to the positioning node, or another node where a neighbor cell load assessment for uplink positioning, e.g. UTDOA positioning, can be done. This load measure can be air interface Rise-over-Thermal (RoT) or noise rise (here signaling exist over Iub). The load measure can also be RoT or noise rise, measured, after a possible Interference Suppression (IS) or Interference Cancellation (IC) receiver applied at least for the reference uplink positioning, e.g. UTDOA measurement, in case decoding is used. Furthermore, no signaling is today available for signaling of the load situation of the own cell, to the positioning node or another node where an own cell load assessment for uplink positioning, e.g. UTDOA positioning, can be made. This load can also be air interface RoT or noise rise (here signaling exist over Iub), or RoT or noise rise, measured after a possible IS or IC receiver applied at least for the reference UTDOA measurement, in case decoding is used.

Furthermore, today, there is no algorithm for selection of the preferred carrier for uplink positioning measurements. As discussed above, if the best carrier to use for measurements is not used by the UE, there is today no triggering mechanism known that performs a switch to said preferred carrier for UTDOA measurement.

Figure 2:
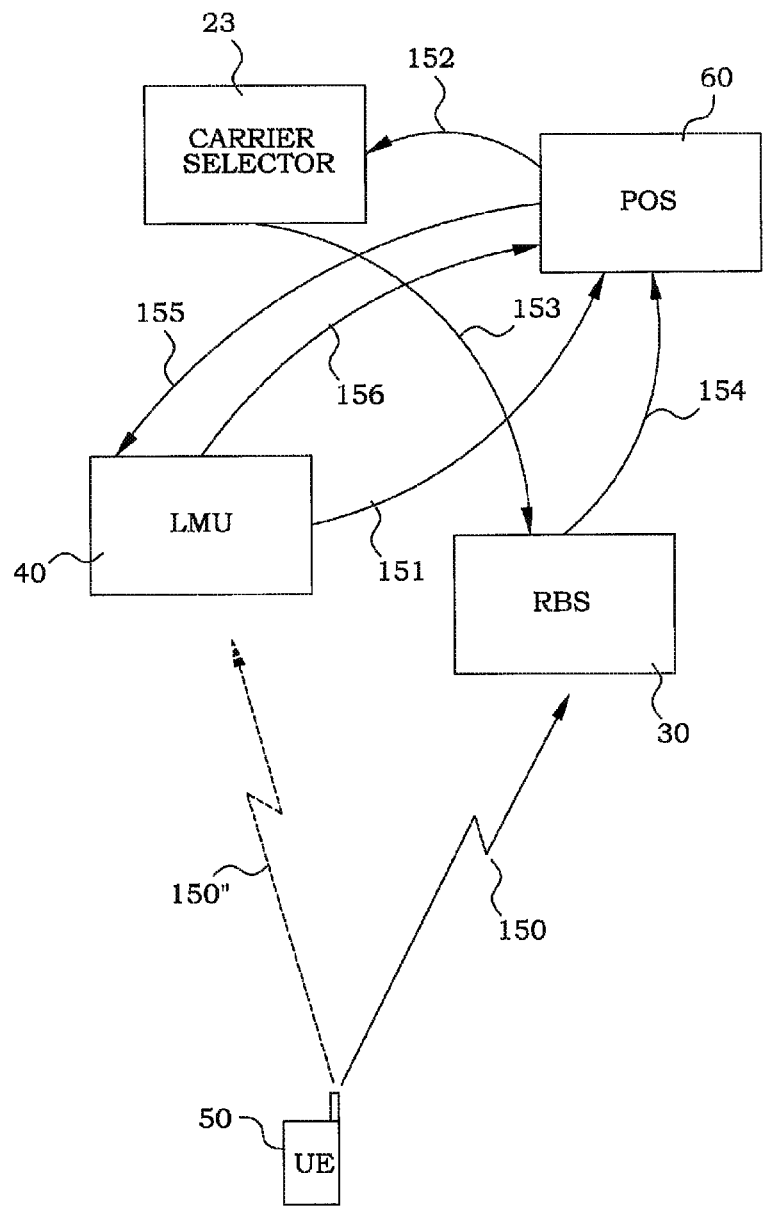
FIG. 2 is a schematic illustration of information flows in an embodiment of a communication system operating according to the present invention.

The above described disadvantages concerning uplink positioning measurements can be improved by improving available information between different nodes of the cellular communication system. FIG. 2 illustrates flows of different kinds of information in a particular embodiment of the present invention.

A UE 50 communicates with a RBS 30 by uplink signals 150. A positioning node 60 has got the task of performing an uplink positioning. The actual measurements are to be performed by a LMU 40. In order to inform the positioning node 60 about the capabilities of the LMU, e.g. about which carriers that the LMU can utilize for making appropriate uplink measurements, the LMU 40 sends carrier capabilities for uplink positioning measurements 151 to the positioning node 60. Such information about carrier capabilities for uplink positioning measurements can be signaled well in advance, e.g. upon configuration of the LMU 40, and can e.g. be stored in a data storage in the positioning node 60. The information may also be sent regularly or intermittently. The information may also be sent as a reply on a request achieved from the positioning node 60. The carrier capability is typically information about a frequency capability or at least frequency-related capability.

To ensure the use of more than one carrier in an uplink positioning system, e.g. an UTDOA positioning system, in a multi-carrier network, the knowledge of the radio node frequency carrier capability and multi-carrier capability may be necessary in the positioning node. The information, about carrier capabilities for uplink positioning measurements therefore preferably comprises information, about frequency-related, capabilities, single-carrier capabilities, multi-carrier capabilities and/or available frequencies for uplink positioning measurements. Further, this information enables configuring transmissions optimized for UTDOA measurements. The UTDOA positioning system is aware of the carrier capability of the radio nodes that may be involved in UTDOA measurements. The UTDOA carrier frequency capability comprises the information about frequencies supported for UTDOA measurements. In one embodiment, the UTDOA frequency capability may include frequency band information and/or duplex mode (e.g., half-duplex) and/or carrier bandwidth available for UTDOA measurements and/or RAT.

Radio node multi-carrier capability for UTDOA may be of interest. The frequency capability information (e.g., a binary indicator or the number of frequencies available for multi-carrier operation which may e.g. be 2, 4 or 8) may include an indication whether the multi-carrier operation is supported and/or configured by the radio node and relevant for UTDOA, e.g., signals simultaneously transmitted over multiple carriers may be measured simultaneously.

UE multi-carrier capability for UTDOA may also be of interest. Multi-carrier capable UEs may transmit the signal over multiple carriers, about which LMU needs to be aware and positioning node supporting UTDOA may also need to be aware and which, in this embodiment, may also be comprised in the frequency capability information. By default, but not necessarily, all carriers supported by the UE may be available for UTDOA measurements, e.g., a subset of combinations or a limited total number of frequencies may be available or simultaneously configured for UTDOA. Further, since UE and radio node may support different number of carriers and the multi-carrier capability of the UE and radio node may vary, the frequency capability may include the number or the combination of frequencies available for multi-carrier operation. For example, there may be dual-carrier UEs in multi-carrier system which may generally support up to e.g. 4 or 8 carriers.

The generalized terms "frequency capability" and "carrier capability" are synonymously used in at least some embodiments to denote frequency-elated capabilities, single-carrier capabilities, multi-carrier capabilities and/or available frequencies for uplink positioning measurements.

The frequency capability indication, such as described above, may be exchanged between radio nodes and positioning nodes. In another embodiment, the frequency capability may also be exchanged between radio nodes, e.g., location measurement units (LMU) and NodeB or between LMUs or between NodeBs over the corresponding interfaces.

In another embodiment, the frequency capability may be obtained (upon a request or without it) from another network node, e.g., Operation and Maintenance (O&M) or Self Organizing Network (SON). In still another embodiment the positioning node may inform the UE on the preferred/possible frequencies on which to transmit for UTDOA positioning, thereby reflecting said capability.

In the present embodiment, the RBS 30 determines the load in terms of e.g. RoT. Such determination can e.g. be useful e.g. for admission control or coverage control. In this embodiment, however, the RoT information can be of great interest also for the positioning node 60. Therefore, the RBS 30 transmits load information 154 to the positioning node 60. This type of information changes relatively fast, and has to be updated relatively frequently. Load information from other radio network subsystems may also be provided to the positioning node, typically by communication between positioning nodes in the different radio network subsystems, e.g. using the Iur interface. However, variations faster than the administrative time for performing an uplink positioning measurement will not be of any particular interest.

The positioning node 60 gathers the carrier capability information 151 and the load information 154 from the own cell and from neighboring cells and makes a decision about which carrier is the best one to use for uplink positioning purposes. If the UE does not presently utilize that selected carrier, the positioning node 60 issues a triggering request 152 for enabling the UE to utilize the selected carrier. The triggering request 152 is sent to a carrier selector 23. The carrier selector 23 is typically an RNC or an RBS. The carrier selector 23 provides an order 153 for enabling the UE to utilize the selected carrier for uplink communication as a response on a received triggering request. The triggering request is therefore in preferred embodiments associated with triggering of inter-frequency handover, switching a carrier, configuring simultaneous transmissions on a subset of carriers, and/or changing from/to single-carrier operation for uplink positioning. When the UE has been given the possibility to communicate with the RBS in the uplink direction at the selected, carrier, the positioning measurements can be performed on signals using such carrier. An uplink positioning measurement request 155 for the UE using the selected carriers is sent from the positioning node 60 to different LMUs 40 (of which one is illustrated). The LMU 40 detects uplink signals 150, originally intended for the RBS and performs measurements appropriate for uplink positioning purposes. Data 156 representing the requested uplink positioning measurements are returned from the LMU 40 to the positioning node 60. The positioning node 60 can thereafter perform a conventional positioning determination.

The uplink positioning measurements are in most embodiments exemplified with UTDOA positioning measurements. However, the uplink positioning measurements may comprise measurements for other types of uplink positioning methods; e.g. a time of arrival, measurement performed in the uplink, a time difference of arrival measurement performed in the uplink, a relative time measurement performed in the uplink, and/or a relative time difference measurement performed in the uplink.

The core unit in the process illustrated in FIG. 2 is the positioning node 60. However, also the other participating nodes have preferably to be updated in order to enable cooperation for achieving the common technical effect.

Figure 3:
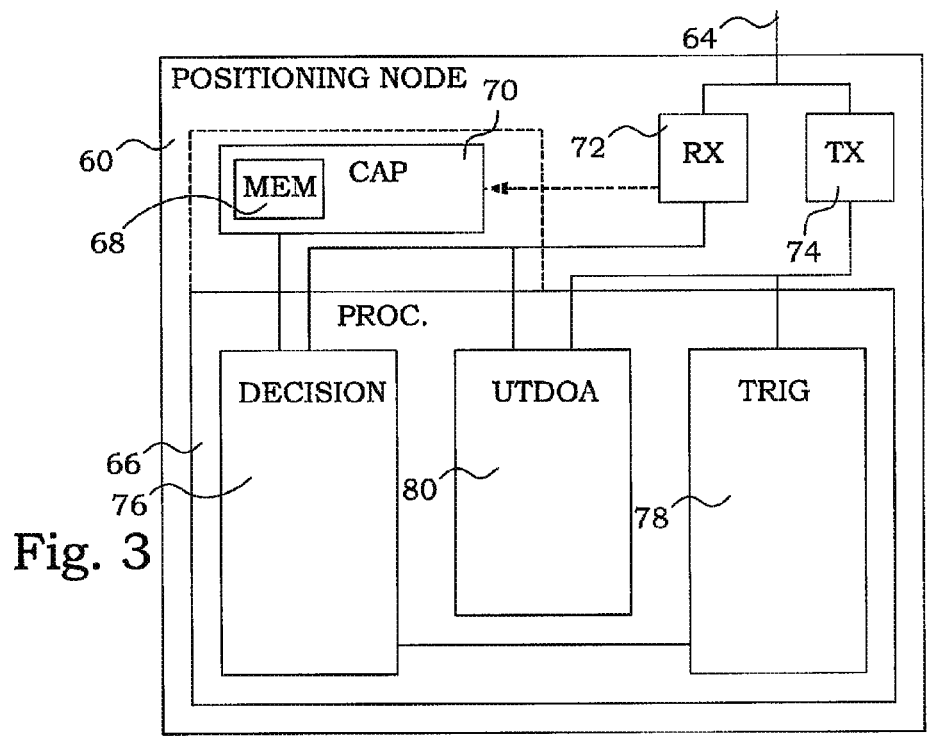
FIG. 3 is a schematic illustration of an embodiment of a positioning node.

FIG. 3 illustrates an embodiment of a positioning node 60. As mentioned before, the positioning node may be provided in an RNC or in another node separate from the RNC. The positioning node 60 of FIG. 3 comprises a receiver 72, a capability collector 70, a processor 66 and a transmitter 74. The receiver 72 is configured for receiving a request for uplink positioning of a user equipment. The capability collector 70 is configured for obtaining information about carrier capabilities for uplink positioning measurements for carriers used in a serving cell of the user equipment. The capability collector 70 may be implemented by the processor 66, as indicated by the broken line around the capability collector 70. The capability collector 70 of the present embodiment comprises a data base in a memory 68. The memory 68 comprises retrievable information about carrier capabilities for uplink positioning measurements. Such information can, as mentioned above, be provided via the receiver 72 at earlier instances, as illustrated by the broken arrow. In alternative embodiments, the capability collector 70 is constituted by the receiver 72, which then is further configured for obtaining the information about carrier capabilities for uplink positioning measurements, signaled from location measuring units.

The processor 66 is connected to the receiver 72 and the capability collector 70 (if not already implemented in the processor). A decision section 76 of the processor 66 is configured for deciding which carrier to be used for uplink positioning measurements, based at least on the information about carrier capabilities. A trigger section 78 of the processor 66 is configured for issuing a triggering request. This triggering request is for enabling the user equipment to utilize the carrier decided to be used for uplink positioning measurements for uplink communication, if the user equipment does not already utilize the carrier decided to be used for uplink positioning measurements for uplink communication.

The transmitter 74 is connected to the processor 66. The transmitter 74 is configured for transmitting an uplink positioning measurement request for the user equipment using the carrier decided to be used for uplink measurements.

The receiver 72 is further configured for receiving data representing the requested uplink positioning measurements. In the present embodiment, the processor 66 comprises a position calculator, in this particular embodiment an UTDOA position calculator 80. The UTDOA position calculator 80, or the position calculator in general, is configured for deducing an uplink positioning of the user equipment from the received data representing the requested uplink positioning measurements. Such position determination is, as such, known in prior art and is therefore not further described here. The transmitter is further configured for reporting the uplink positioning of the user equipment.

If the positioning node is incorporated in e.g. an RNC, the transmitter 74 is also used for communication within the RNC, e.g. of the triggering request. The transmitter 74 is thus configured for signaling the triggering request to a node, configured for being allowed to order an enabling for a user equipment to utilize a carrier. In one particular embodiment the node, configured for being allowed to order an enabling for an user equipment to utilize a carrier, is a base station. In another particular embodiment the node, configured for being allowed to order an enabling for an user equipment to utilize a carrier, is a radio network controller.

In the present embodiment, the receiver 72 is further configured for receiving data representing a respective load measure for a plurality of cells and carriers available for uplink positioning measurements of the user equipment. The load measures are determined in base stations possibly concerned by the uplink positioning and are provided to the positioning node 60 either directly from the base stations or if the base stations are comprised in another radio network subsystem, via another positioning node. The decision section 76 is thereby further configured for performing the deciding further based on the data representing a respective load measure.

Figure 4:
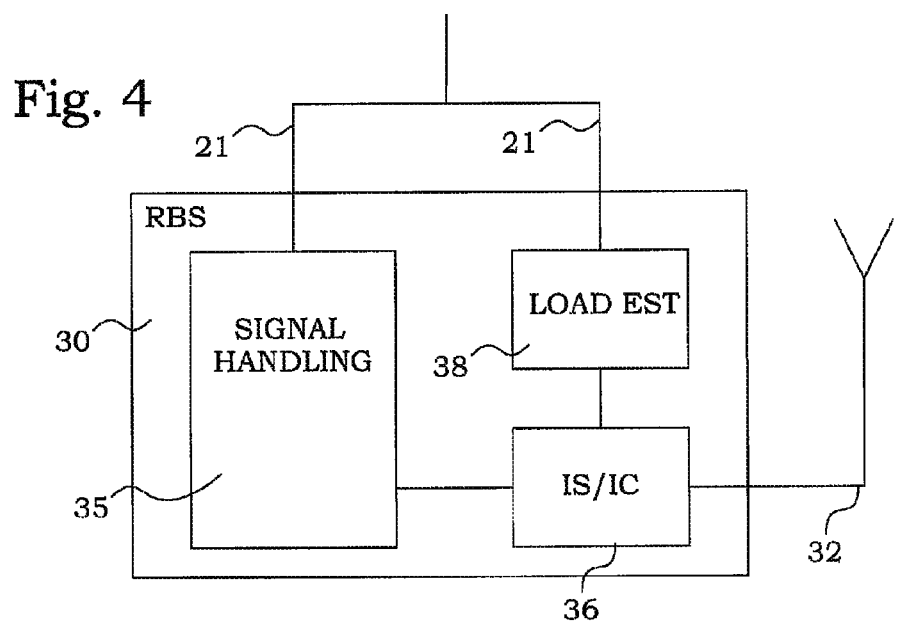
FIG. 4 is a schematic illustration of an embodiment of a radio base station.

FIG. 4 illustrates an embodiment of a radio base station 30 able to provide such data representing a respective load measure mentioned here above. The RBS 30 comprises an antenna 32, a load estimator 38 and a transmitter 37. The antenna 32 is in this embodiment configured for communication with user equipments via at least one of at least two carriers. The load estimator 38 is configured to estimate a respective load of radio signaling on the at least two carriers. The transmitter 37 is connected to the load estimator 38, and is configured for reporting the respective loads to a positioning node over the Iub interface 21.

In the present embodiment, the RBS 30 also comprises an IS/IC section 36, connected to the antenna 32. The IS/IC section 36 removes some of the interference of the received signal and provides the interference suppressed signals or interference cancelled signals to a signal handling section 35 in which ordinary signal treatment is performed. The signals are then provided over the Iub interface to the RNC. In this embodiment, the load estimator 38 operates on the signals that are interference suppressed or interference cancelled, thereby providing a load measure after interference suppression or interference cancellation.

Figure 5A:
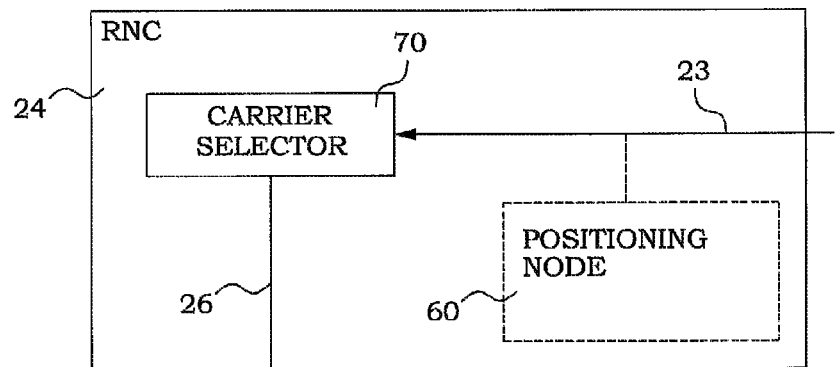
FIGS. 5A-B are schematic illustrations of nodes in a radio network subsystem configured for providing an order for enabling a user equipment to utilize a specific carrier for uplink communication.

FIG. 5A illustrates an embodiment of a node 24 of a radio network subsystem having capabilities for providing an order for enabling a user equipment to utilize a carrier for uplink communication with a radio base station. In this particular embodiment the node 24 is an RNC. The node 24 comprises a carrier selector 70 which is configured for providing an order 26 for enabling a user equipment to utilize a carrier for uplink communication with a radio base station. The carrier selector 70 is also configured for receiving a triggering request 23 for enabling a user equipment to utilize a carrier for uplink communication. That carrier is a carrier decided to be used for uplink positioning measurements. The triggering request 23 is received from a positioning node. In one embodiment, the positioning node is external to the RNC. However, in an alternative embodiment, the positioning node 60 can be integrated with the RNC, as indicated by the broken line features in FIG. 5A. The carrier selector 70 utilizes the triggering request 23 and provides the order 26 for enabling the user equipment to utilize the carrier for uplink communication as a response on the received triggering request 23.

Figure 5B:
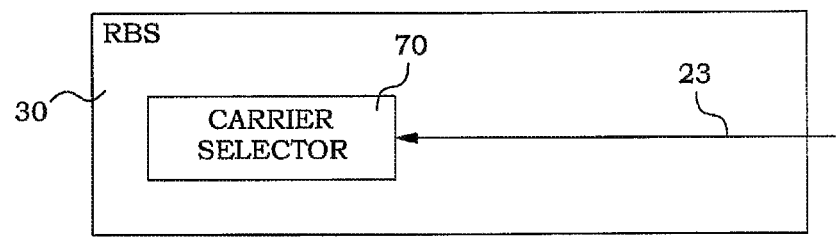

In FIG. 5B, another embodiment of a node 24 of a radio network subsystem having capabilities for providing an order for enabling a user equipment to utilize a carrier for uplink communication with a radio base station is illustrated. In this embodiment, the node 24 is an RBS. The enabling of the user equipment to utilize the carrier for uplink communication is performed as a response on the received triggering request 23 and utilizes prior art communication possibilities with the UE to implement such carrier utilization.

Figure 6:
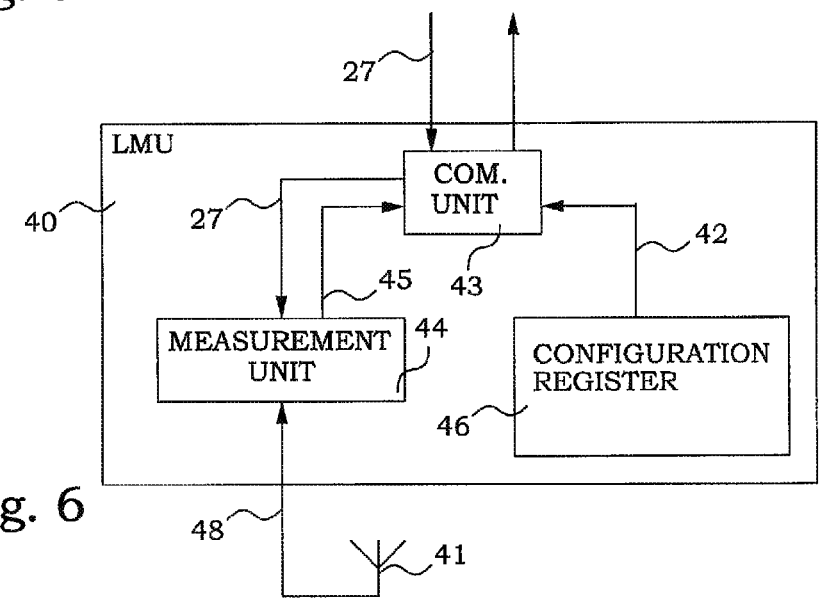
FIG. 6 is a schematic illustration of an embodiment of a location measurement unit.

FIG. 6 illustrates an embodiment of a location measurement unit 40. The LMU 40 can be a separate unit, or it can be incorporated in or coordinated with other radio access network nodes, e.g. base stations. The LMU 40 comprises an antenna 41, a measurement unit 44 and a communication unit 43. The antenna is configured for reception of uplink radio signals. If the LMU is a separate unit, the received signals themselves are not forwarded to any other node. But properties of the received uplink signals may be analyzed, and such analysis can constitute the ground on which e.g. positioning can be based. To this end, the measurement unit 44 is connected to the antenna 41. The measurement unit 44 is configured for uplink positioning measurements on the radio signals 48 received by the antenna 41. The communication unit 43 is connected to the measurement unit 44. The communication unit 43 is configured for receiving uplink positioning measurement requests 27, which are forwarded to the measurement unit 44. The communication unit 43 is also configured for transmitting uplink positioning measurement reports 45 created by the measurement unit 44. Furthermore, the communication unit 43 is further configured for reporting 42 which carriers that are available for uplink positioning measurements, to a positioning node. In this embodiment, the LMU 40 comprises a configuration register 46, from which information about available carriers are stored. When the reporting 42 which carriers that are available for uplink positioning measurements is to take place, the request information is retrieved from the configuration register 46.

Figure 7A:
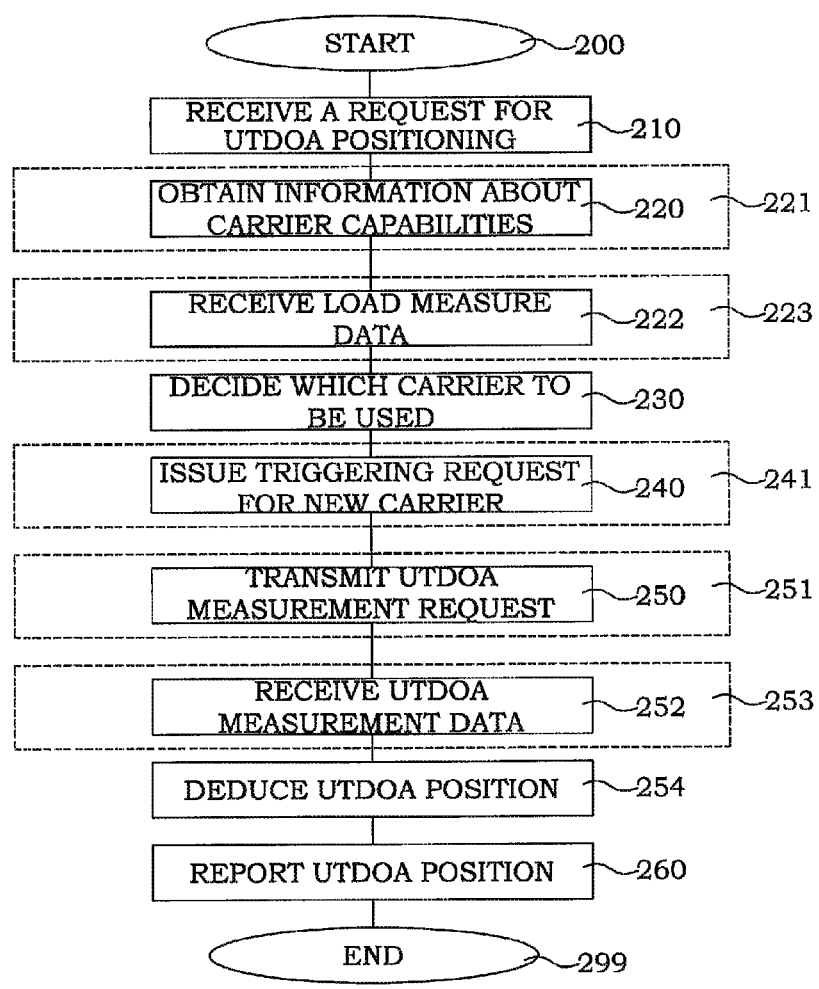
FIGS. 7A-D are flow diagrams of embodiments of methods for performing or assisting in uplink positioning, intended to be performed in different nodes of a communication system.

A flow diagram of steps of an embodiment of a method for performing uplink positioning is illustrated in FIG. 7A. The method is intended to be performed in a positioning node. The process starts in step 200. In step 210, a request for uplink positioning of a user equipment is received. This is typically received from the RNC, but other scenarios are also possible. Positioning requests from nodes of e.g. other radio access technologies or from neighboring RNSs are also feasible, at least in a future. Information about carrier capabilities for uplink positioning measurements for carriers used in a serving cell of the user equipment is obtained in step 220. The step 220 is comprised in a general procedure 221 of obtaining carrier capability information, typically involving also other nodes than the positioning node. In a particular embodiment, step 220 comprises retrieving of the information about carrier capabilities for uplink positioning measurements from a database in a memory. The database is typically built by information achieved by previous communication with base stations, LMUs or RNCs or by direct configuration. In another particular embodiment, step 220 comprises receiving the information about carrier capabilities for uplink positioning measurements, signaled from location measuring units. Such embodiment then typically also comprises sending of a carrier inquiry to the location measuring units. However, in alternative embodiments, the LMUs may issue the information about carrier capabilities for uplink positioning measurements as a regular updating routine.

In the present embodiment, several carriers are available for one single user equipment. It is the preferred to also utilize the carriers in a best possible way for positioning purposes. Hence, in step 222, data representing a respective load measure for a plurality of cells and carriers available for uplink positioning measurements of the user equipment is received. The load measures are determined in base stations possibly concerned by the uplink positioning. The step 222 is comprised in a general procedure 223 of obtaining load measure data, involving also other nodes than the positioning node. In a particular embodiment, step 222 comprises an inquiry sent from the positioning node to different concerned base stations, possibly also via neighboring RNCs, asking for recent load determinations. The base stations reply by sending latest possible load estimations. These load estimations could even be performed in response to the inquiry. In another particular embodiment, the base stations may provide load estimations regularly to the positioning node without need for any inquiry to be sent.

In step 230, it is decided which carrier is to be used for uplink positioning measurements. This decision is based at least on the information about carrier capabilities. In embodiments where also load measure data is available, the decision step is preferably further based on the data representing a respective load measure.

A triggering request for enabling said user equipment to utilize said carrier decided to be used for uplink positioning measurements for uplink communication is issued in step 240. This triggering request is issued if the user equipment does not utilize the carrier decided to be used for uplink positioning measurements for uplink communication. In a particular embodiment, step 240 also comprises signaling of the triggering request to a node, configured for being allowed to order an enabling for a user equipment to utilize a carrier. Such a node can, as mentioned further above, be e.g. a base station or a radio network controller. Also here, the step 240 is comprised in a general procedure 241 for carrier control, involving also other nodes than the positioning node. This will be discussed more in detail further below. In step 250 an uplink positioning measurement request is transmitted. The request concerns the user equipment using the carrier decided to be used for uplink positioning measurements. The step 250 is comprised in a general procedure 251 for performing uplink positioning measurements, involving also other nodes than the positioning node. This will be discussed more in detail further below. In a particular embodiment the uplink positioning is based on based on uplink time difference of arrival-UTDOA measurements. In step 252, data representing the requested uplink positioning measurements is received. The step 252 is comprised in a general procedure 253 for reporting uplink positioning measurements, involving also other nodes than the positioning node. This will be discussed more in detail further below.

The uplink measurement data could be forwarded in a more or less unprocessed form to other nodes having need for positioning measurements. Some examples could be e.g. for building up AECID positioning databases across different radio access technologies. The uplink measurement data could also be stored for later processing e.g. for statistical studies. However, in most cases, an immediate positioning is requested. In the present embodiment, being a preferred embodiment, the uplink positioning of the user equipment is deduced in step 254. This deduction is made from the received data representing the requested uplink positioning measurements. In step 260, the uplink positioning of said user equipment is reported. This reporting is performed to the node requesting the positioning or to a node identified in the positioning request. The procedure ends in step 299.

Figure 7B:
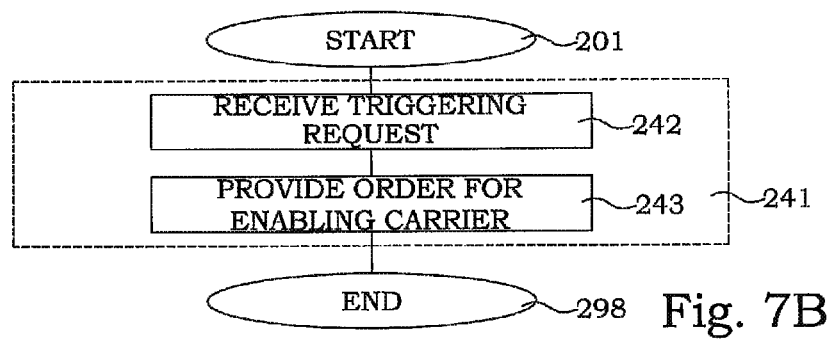

In FIG. 7B, a flow diagram of steps of an embodiment of a method for assisting in uplink positioning is illustrated. The method is intended to be performed in a node of a radio network subsystem. Such node can e.g. be a radio network controller or a radio base station. The procedure starts in step 201. In step 242 a triggering request for enabling a user equipment to utilize a carrier for uplink communication is received from a positioning node. The carrier is a carrier decided to be used for uplink positioning measurements. In step 243, an order for enabling the user equipment to utilize a carrier for uplink communication is provided as a response to the triggering request. Steps 242 and 243 can be considered as parts of the general procedure 241 for carrier control, mentioned earlier. The procedure ends in step 298.

Figure 7C:
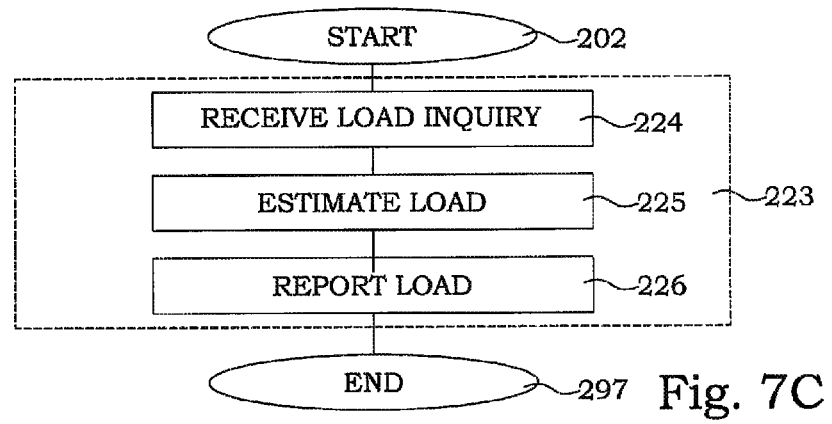

In FIG. 7C, a flow diagram of steps of an embodiment of a method for assisting in uplink positioning is illustrated. The method is intended to be performed in a radio base station. The procedure starts in step 202. In the present embodiment, in step 224, a load inquiry is received from a positioning node. In other embodiments, e.g. where load determinations are performed regularly, the step 224 can be omitted. In step 225, a respective load of radio signaling on carriers configured for communication with user equipments is estimated. The respective loads are reported in step 226 to a positioning node. Steps 224-226 can be considered as parts of the general procedure 223 of obtaining load measure data, mentioned earlier. The procedure ends in step 297.

Figure 7D:
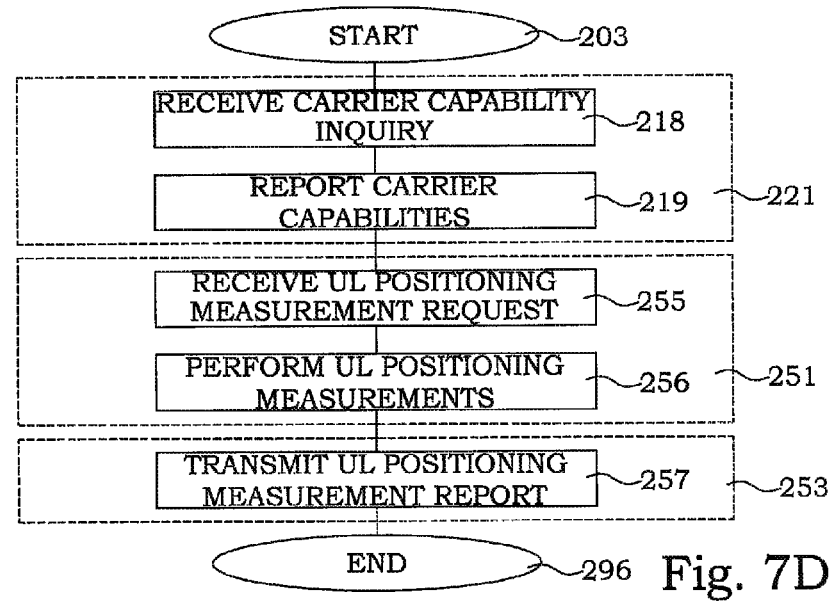

In FIG. 7D, a flow diagram of steps of an embodiment of a method for assisting in uplink positioning is illustrated. The method is intended to be performed in a location measurement unit. The procedure starts in step 203. In the present embodiment, in step 218, an inquiry about carrier capabilities is received from a positioning node. In other embodiments, e.g. where carrier capabilities are reported regularly, the step 218 can be omitted. In step 219, it is reported to a positioning node, which carriers are available for uplink positioning measurements. Steps 218-219 can be considered as parts of the general procedure 221 of obtaining carrier capability information, mentioned earlier. In step 255 an uplink positioning measurement request is received. In step 256 the uplink positioning measurement is performed. Steps 255-256 can be considered as parts of the general procedure 251 for performing uplink positioning measurements, mentioned earlier. An uplink positioning measurement report is in step 257 transmitted to the node requesting the positioning measurements. Step 257 can be considered as a part of the general procedure 253 for reporting uplink positioning measurements, mentioned earlier. The procedure ends in step 296.

Figure 8:
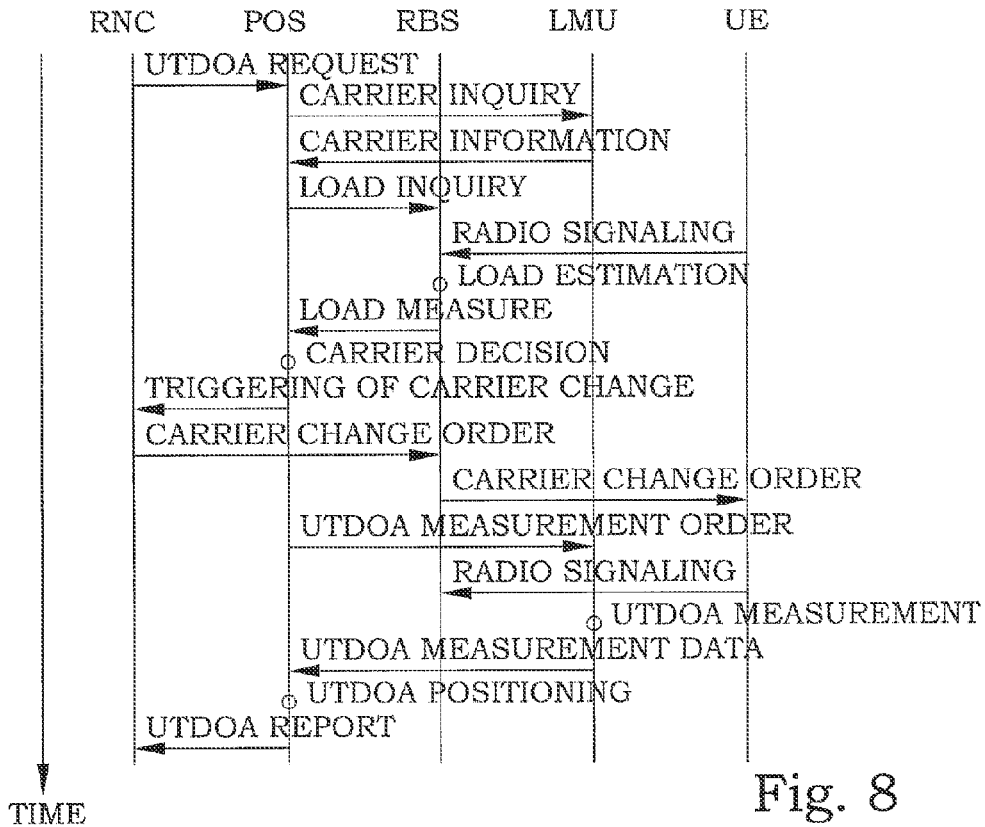
FIG. 8 illustrates an embodiment of communication between different network nodes.

Since the overall procedure typically involves a number of nodes, and the flow diagrams of FIGS. 7A-7D are illustrating methods within different nodes, it might be difficult to achieve an overview of the communication scheme. FIG. 8 illustrates an example of communication, measurements and evaluation of an embodiment of a positioning procedure. Note that FIG. 8 is an example given for facilitating an understanding of possible cooperation between nodes during positioning and should not be considered as limiting the scope of the invention.

in FIG. 8, a number of actions are illustrated in a time sequence, where the time increases towards the bottom of the figure. First an UTDOA positioning request concerning a user equipment is sent from an RNC to a positioning node. Although, the positioning node here is illustrated as a separate node, the typical case is that the positioning node is incorporated in another node, e.g. an RNC or SAS node. The sending of the positioning request may, e.g. in the case the positioning node is incorporated in the RNC, be an internal signaling. The positioning node reacts on this request and sends a carrier inquiry to LMUs that possibly could be used for such positioning. The LMUs reply by providing information about carrier capabilities. The positioning node also sends a load, inquiry to RBSs utilizing carriers that might be used for positioning purposes of the user equipment. The UE utilizes the carrier for radio signaling, and such signals are utilized by the RBS to estimate the load of each carrier. A measure of this estimated load for each carrier is reported to the positioning node.

In a particular embodiment, also the LMU may perform a load estimation. The result of such a load estimation can be communicated to the positioning node, either directly or via the RBS.

The positioning node utilizes the information about the carrier capabilities and the estimated loads to decide which carrier is the best one for performing positioning measurements on. If the user equipment presently is not allowed to use that carrier, a triggering request for a carrier change is sent to the RNC. The RNC responds to such triggering request by ordering a change of carrier or at least, if the user equipment may use several carriers simultaneously, ordering that the user equipment should have the possibility to use the selected carrier.

The positioning node can also, in particular embodiments, order a LMU to adapt measurements according to the selected carrier, either directly or via e.g. the RNC.

The positioning node sends a measurement order, in this particular example of an UTDOA measurement, to the LMUs that can be utilized. The LMUs perform the requested measurements and reports the UTDOA measurement data back to the positioning node. In embodiments where the RBS performs the measurements, the RBS takes over the function of the LMU. In embodiments where the RBS and LMU shares the antenna, the reference point of the radio signaling becomes the RBS antenna, although the LMU performs the actual processing. The positioning node collects the measurement data and performs an UTDOA positioning. This position is in the present embodiment reported to the RNC as a reply to the original UTDOA positioning request. The position is typically reported to the node which requested positioning, e.g. a LCS Client, and the LCS Client may reside in any node e.g., in the UE, in a radio node, in a core node, or as an external client. However, in the embodiment presented here above, the RNC was the requesting node. In alternative embodiments, the position doesn't have to be reported, but can instead be saved for future utilization or further processing.

As anyone skilled in the art understands, the communication scheme depends strongly on the configuration of the communication system, capabilities of the different nodes etc., and FIG. 8 should only be regarded as an example.

Load estimation in e.g. the WCDMA uplink is performed for many reasons in prior art. Most importantly, the present scheduling of enhanced uplink traffic is based on the principle to schedule users until a load threshold is reached. Such scheduling decisions are taken every 2/10 ms transmission time interval (TTI). Thresholds are typically used in order to maintain a planned coverage, and to maintain cell stability avoiding inner loop power control (ILPC) power rushes. When coverage is addressed, neighbor cell interference is incorporated in the load measure, this is not the case when cell stability is treated. The scheduling and load estimation functionality and algorithms are both located in the WCDMA RBS.

It is also possible to use the estimated uplink load in load based admission control algorithms. Also this is known as such in prior art. These algorithms use the uplink load in order to determine if new users can be admitted in specific cells. The admission control functionality is located in the RNC node. Signaling means for signaling of load is available over the NBAP interface.

General aspects of load measurements and problems connected thereto are discussed in more detail in Appendix B.

In a system supporting multiple frequencies, uplink positioning measurements and UTDOA measurements in particular may be optimized in different respects. There is a measurement quality perspective. This accounts e.g. for the load on the air interface and thus the signal quality, for measurement bandwidth on the frequency carriers, or for frequency since lower frequencies typically provide better coverage which is crucial in large cells and may be not necessary in small cells. The load estimation may follow the methods described in the current invention. The measurements may also be optimized concerning network resource optimization since the resources for positioning measurements are shared with other services.

Based on the available information, the positioning node may decide to do or not to do at least one of the following. The positioning node may trigger inter-frequency handover or switching the carrier for a UE with poor positioning performance. The positioning node may switch the primary carrier for UEs supporting multi-carrier operation. The positioning node may configure simultaneous transmissions on carriers, depending e.g. on the frequency capability information, such as described above, where the set of carriers configured for UTDOA may be smaller than the set of carriers supported in the network. The positioning node may also change from/to single-carrier operation for UTDOA in the network supporting more than 1 frequency in general. When positioning functionality is not in the node responsible for applying configuration changes described above, the configuring, switching, or triggering a change herein implies instructing the node responsible for applying the change (e.g., sending a message to the serving node of the UE in question and/or sending a message to the radio nodes such as eNodeB in LTE or LMUs that are expected to perform measurements on new frequencies).

In case more than one carrier is available for UTDOA positioning measurements, it may be desirable to select the most appropriate one. This section of the detailed description describes the measurements and signaling needed for this purpose.

For all but the UTDOA reference positioning measurement, the load is addressed by measurement of the air interface RoT, as described in prior art. As described in prior art, the RoT can be signaled over the Iub interface, separated in a noise floor and a total received wideband power. However, in case of a RNC centric architecture, the RoT, or the noise floor and the received total wideband power, needs to be signaled over an internal interface to the integrated positioning node i.e. to the position calculation function. This internal signaling is new and disclosed here. More importantly, in case of a SAS centric architecture, the RoT, or the noise floor and the received total wideband power, must be signaled over the Iupc interface to the SAS positioning node. This introduces new signaling.

The reference UTDOA positioning measurement unit may apply interference suppressing receivers in order to enhance the receiver performance. In that case the effective load is reduced. The following sections disclose new methods for measurement of said load in terms of RoT, accounting for IS gains, i.e. e.g. RoT estimation after G-rake+.

In Appendix C, it is discussed how an equivalent of the RoT can be computed after G-rake+ IS gains. The details are presented in Appendix C. The end result is given by (c.f. C12, C22, C24):

$$RoT_u^{G+} \equiv \frac{S_u^{G+} + I_u^{G+} + \kappa_u^{G+}\hat{N}}{\kappa_u^{G+}\hat{N}} = \frac{S_u^{G+}}{\kappa_u^{G+}\hat{N}}\left(1 + \frac{SF_{u,DPCCH}}{\beta_{u,effective}^2} \frac{1}{SINR_u^{G+}}\right), \quad (1)$$

$$u = 1, \ldots, U.$$

$$\kappa_u^{G+} = (\hat{w}_u)^H \hat{w}_u, u = 1, \ldots, U. \quad (2)$$

$$RoT^{G+} = \max_u RoT_u^{G+}. \quad (3)$$

Here $RoT_u^{G+}$ is the load seen by user u, $S_u^{G+}$ is the power of user u measured after the G-rake+, $SF_{u,EDPCCH}$ is the spreading factor, $\beta_{u,effective}$ is the total power factor, and $SINR_u^{G+}$ is the signal to interference ration measured after G-rake+, i.e. the quantity that closes the inner power control loop. As can be seen, the cell load is selected as the maximum rise over thermal, as seen by any user of the cell. This is the limiting user of the cell.

In Appendix D, it is discussed how an equivalent of the RoT can be computed after FDPE IS gains. The details are presented in Appendix D. The end result is given by (c.f. D5):

$$RoT^{FDPE} = \frac{z_{pre}^H(t)z_{pre}(t)}{\left(\sum_{l=0}^{L-1} w_{pre}^H(l)w_{pre}(l)\right)\left(\sum_{a=1}^{A} \hat{N}_a^{thermal}\right)}. \quad (4)$$

Here is the load, $z_{pre}(t)$ is the whitened signal in the time domain, $w_{pre}(l)$, $l=0, \ldots, L-1$ is the impulse response of the whitening filter, and $\hat{N}_a^{thermal}$, $a=1, \ldots, A$, are the estimated thermal noise floors of the A antenna branches.

The quantities above should be computed as averages or estimates over a time interval where the whitening filter of the FDPE remains constant. The result is intuitive. Since the total received wideband power is summed over all antenna branches, so is the thermal noise power floor. The RoT after FDPE is also scaled with the power of the pre-whitening filter.

It can be noted that the use of FDPE handles the received signal as a whole, without a need to consider individual users. This advantage is retained for the load, estimation algorithm.

In Appendix E, it is discussed how an equivalent of the RoT can be computed after FDE IS gains. The details are presented in Appendix E. The end result is given by (c.f. E5):

$$RoT_u^{FDE} = \frac{z_{FDE,u}^H(t)z_{FDE,u}(t)}{\left(\sum_{l=0}^{L-1} w_u^H(l)w_u(l)\right)\left(\sum_{a=1}^{A} \hat{N}_a^{thermal}\right)}, \quad (5)$$

$$u = 1, \ldots, U.$$

Here $RoT_u^{FDE}$ is the load of user u, $z_{pre,u}(t)$ is the whitened signal in the time domain, $w_{pre,u}(l)$, $l=0, \ldots, L-1$ is the impulse response of the whitening filter, and $\hat{N}_a^{thermal}$, $a=1, \ldots A$, are the estimated thermal noise floors of the A antenna branches.

The quantities above should be computed as averages or estimates over a time interval where the equalizing filter of the FDE remains constant. The result is intuitive. Since the total received wideband power is summed over all antenna branches, so is the thermal noise power floor. The RoT after FDE is also scaled with the power of the equalizing filter.

As in the G-rake+ case, the dominating user of the cell is selected as $$RoT^{FDE} = \max_u RoT_u^{FDE} \quad (6)$$

The RoT before and/or after IS processing normally vary fast, being affected e.g. by channel variations. Since the interference estimates that can be used for UTDOA carrier selection support more slow selection processes, they must rather rely on the average uplink load, obtained for a typical time interval. This time interval or filtering time constant, is preferably tuned to be of the same order as the bandwidth of the carrier selection process. As a typical embodiment of this filtering process a first order autoregressive filter can be used:

$$\langle RoT \rangle(t+T) = \alpha \langle RoT \rangle(t) + (1-\alpha)RoT_{input}(t) \quad (7)$$

where $\langle RoT \rangle$ is the average load, T is the update time period, e.g. 10 ms, $\alpha$ is the time constant and $RoT_{input}$ is any of the RoT at the antenna connector, $RoT^{G+}$, $RoT^{FDPE}$ or $RoT^{FDE}$. This filtering is preferably performed in the positioning node.

Signaling of RoT after IS Processing

The RoT after IS processing have today no associated signaling. The definition of the measurement of these RoT equivalents is different from the air interface RoT. Therefore preferred embodiments of the present invention discloses means for taking care of this.

The positioning node therefore preferably comprises means which determines the serving and associated neighbor cells and carriers for which. RoT of various kinds shall be measured. The received (or obtained in any other way) UTDOA positioning measurement capability is an input for this step. So is also the database of cell relations, cell positions and antenna directions. This information needs preferably to be configured in the positioning node, or at least be available there. The algorithm that determines which neighbors that are interesting for UTDOA positioning measurements is responsive at least to the above mentioned parameters.

In a preferred embodiment, there is also need for signaling means covering the interfaces from the positioning node (e.g. in a SAS or RNC) to the RBSs (Iub, Iur and Iupc) that constitute the locations of the UTDOA positioning measurements. These signaling means cover a measurement order and information of which type of RoT that is preferred.

In a preferred embodiment, there is also need for signaling means covering the interfaces from the RBSs to the positioning node (RNC or SAS) that constitute the UTDOA measurement locations (Iub, Iur and Iupc). These signaling means cover RoT measurement information, together with an indication of what type of RoT information that is signaled. Thus, a method for assisting in uplink positioning performed in a radio base station preferably comprises estimation of a respective load of radio signaling on carriers configured for communication with user equipments. The method also comprises reporting of the respective loads to a positioning node.

The next task is the load based carrier selection mechanism and the handover or carrier switching trigger. For a successful UTDOA positioning, there are two criteria that need to be met. The first is a successful detection and decoding in the UTDOA reference measurement location (typically a serving cell). The second is a successful detection in as many UTDOA neighbor measurement locations as possible. Both these criteria are associated with the uplink interference situation. This is the reason why load measurements in terms of the RoT are selected to assess the interference situation on different carriers.

In a preferred embodiment, the disclosed algorithm evaluates a criterion, for each carrier alternative, where the criterion is responsive to the measured and signaled load values, i.e. $\langle RoT \rangle$(carrier,cell),cell$\in$\{cell$_i$\}, i$\in$\{neighbors\}, carrier$\in$\{UTDOA capable carriers\}. This is however not generally enough. The neighbor cells have different antenna directions and locations as well. Therefore the load assessment needs to be complemented with the predicted path loss and the predicted antenna gain, for each cell. This information needs to be available in databases, accessible by the positioning node.

It is now possible to set up a cost for each cell, and carrier combination:

$$J(\text{carrier,cell,servingcell}) = f(\langle \text{RoT} \rangle(\text{carrier,cell}),$$
$$\langle \text{Pathloss} \rangle(\text{carrier,cell,servingcell}), \langle \text{Antenna-gain} \rangle(\text{cell,servingcell}), \text{TxPower}(\text{cell}), \ldots), \quad (8A)$$

where the set of the parameters in function $f$ is a non-limiting example which may comprise RoT, pathloss, antenna gain, transmit power, etc., and where an example of function $f$ may be as follows, $$J(\text{carrier,cell,servingcell}) = \langle \text{RoT} \rangle(\text{carrier,cell}) + |\langle \text{Pathloss} \rangle(\text{carrier,cell,servingcell})| - \langle \text{Antenna-gain} \rangle(\text{cell,servingcell}) \quad (8B)$$

Here the pathloss is counted from the center of the serving cell to the antenna location of the RBS of the UTDOA positioning measurement unit. The antenna gain is computed using the angle between the center of the serving cell and the antenna location of the RBS of the UTDOA positioning measurement unit. The computation of the antenna, gain is further considering the bore sight angle of the antenna of the cell of the RBS of the UTDOA positioning measurement unit. All quantities are expressed in dB. The carrier is then selected by calculation of the minimum threshold value $\bar{J}(\text{carrier})$, for each carrier, for which $J(\text{carrier,cell,servingcell}) \leq \bar{J}(\text{carrier})$ for N cells.

$$selectedcarrier = \underset{carrier}{\operatorname{argmin}} \bar{J}(\text{carrier}) \quad (9)$$

In other words, the deciding preferably comprises a calculation of a cost for each cell and carrier combination available for UTDOA measurements of the user equipment. This cost is calculated according to a predetermined algorithm responsive to the data representing the load measures and the information about carrier capabilities. The decision then comprises selection of a carrier, having most beneficial costs for N cells. The most beneficial cost is, with a typical definition of cost, the lowest cost. This is performed according to a predetermined criterion. That carrier is decided to be used for UTDOA measurements. N is a predetermined number, equal or larger than a minimum number of measurements needed to ensure an UTDOA positioning. More preferably, the decision further comprises determining of a minimum threshold value for each carrier such that the cost for N cells is lower than the minimum threshold value. The selection of the carrier to be used for UTDOA measurements then comprises selection of the carrier having a lowest minimum threshold value. In a preferred embodiment, the calculation of the cost is responsive to a pathloss between a reference point in a serving cell and the antenna subject to measurements, and/or an antenna gain of the cell in question relative to the serving cell. The decision is preferably based on a time filtered version of the data representing a respective load measure.

In a preferred embodiment, standard procedures are then used to force the UE to the selected carrier, if the UE is not already in the selected carrier. This concerns both the case of conventional carrier selection performed by the RNC and multi carrier. The procedures may then comprise handover and carriers switching. In UNITS, these decisions are typically made by RNC and possibly the NodeB. In the prior art, however, these decisions cannot be triggered by UTDOA positioning functionality accounting to optimize UTDOA performance. Further, if the positioning functionality and the procedures to move the UE to the selected carrier are in different nodes (e.g., RNC and NodeB), then the corresponding signaling for triggering these procedures in the other node may be necessary. Therefore, preferably a triggering request for enabling the user equipment to utilize the carrier decided to be used for uplink positioning measurements for uplink communication is issued and communicated to the concerned nodes. Note also that in LTE, handover and carrier switching are performed by the eNodeB, whilst the positioning functionality is in the positioning node (e.g., E-SMLC), which implies communication between the triggering node and the node applying the configuration.

The above principles are also applicable for other types of uplink positioning measurements than UTDOA measurements. Some examples of such measurements may be E-CID measurements, e.g., uplink E-CID measurements.

As mentioned briefly in the background section, there are a number of problems with AECID positioning in WCDMA and GSM according to prior art. The basic principles of AECID are briefly presented in Appendix A. A-GPS positioning has a very low availability indoors, hence it is difficult to populate the AECID databases for indoor radio environments, using high-precision reference measurements. The use of UTDOA positioning measurements thus becomes an alternative to GPS positioning e.g. in indoor environments.

Furthermore, in case UTDOA would be available in WCDMA, these high precision measurements could also be used to populate GSM AECID databases and LTE AECID databases. This can be performed by applying inter-RAT measurements to determine cells and signal strengths in the other RAN. However, there is no signaling of positioning information standardized or known in prior art that allows for this. The same applies also e.g. to if UTDOA would be available in LTE. The inter-RAT measurements of LTE could be used to populate other RATs' AECID databases.

Positioning based on uplink measurements, in particular UTDOA provides an additional source of high precision reference positions. In other words, the reporting of the obtained high-precision positioning of the user equipment can be seen as comprising reporting of the high-precision positioning as a reference position for an AECID positioning method. The transmitter of the positioning node is thereby further configured for reporting the high-precision positioning as reference position for an AECID positioning method.

Figure 9:
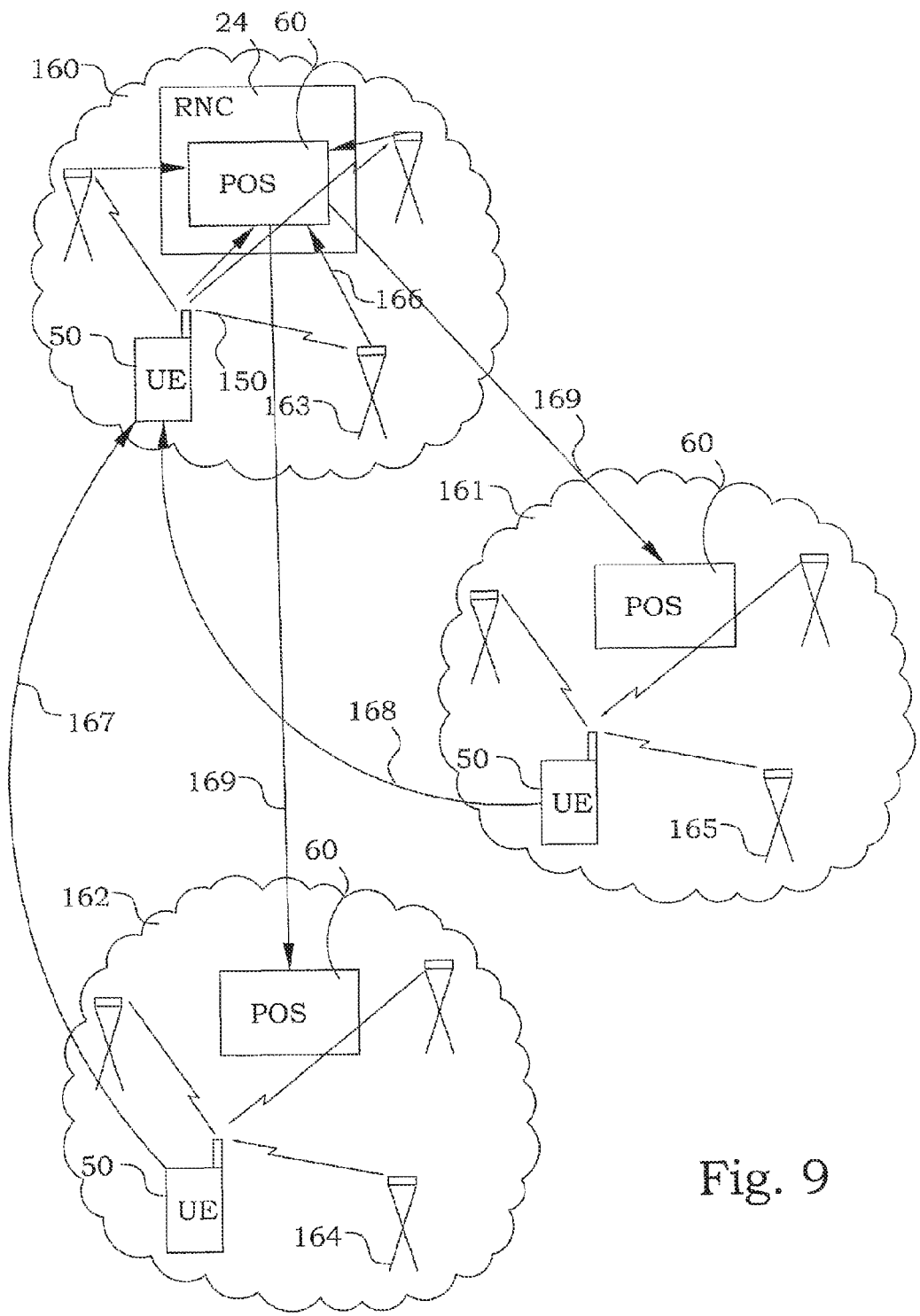
FIG. 9 illustrates an embodiment of an architecture for distribution of fingerprinted. UTDOA reference points.

An embodiment of a multi-RAT distribution architecture of fingerprinted UTDOA high precision reference positions is illustrated in FIG. 9. In the present embodiment a UE 50 is present in an area covered by a WCDMA network 160, a LTE network 161 and a GSM network 162. In the figure, the networks are illustrated as separated spatially from each other for increasing the readability of the figure, however, in practice the networks are spatially overlapping. The UE 50 is therefore simultaneous present within the coverage range of all networks. The UE 50 comprises parts (indicated by broken lines) that comprise functionality for communication according to the different radio networks. The networks comprise radio base stations, in the case of the GSM network 162, base stations 164 are available, in the case of the WCDMA network 160, Node B's 163 are available and in the case of the LTE network 161, eNode B's 165 are available. The UE 50 is assumed to be connected to the WCDMA system.

The procedure begins when the WCDMA system 160 determines that an UTDOA positioning is to be performed for the UE 50. Normally this means that an A-GPS positioning has failed or is expected to fail. The A-GPS positioning method is normally the first choice since this method having an accuracy that typically is superior to that of UTDOA. The UTDOA measurement units associated with the NodeB, i.e. the RBS of the WCDMA network 160, of the serving and neighbor cells perform UTDOA measurements. These measurements are then communicated 166 to the positioning node 60 and combined in the positioning node 60 of the WCDMA network 160 to an UTDOA position. At this stage an UTDOA position exists in the WCDMA positioning node.

Then the GSM radio part of UE 50 performs inter-RAT measurements on the GSM network 162, determining e.g. cell IDs of neighbor GSM base stations 164 as well as signal strength with respect to these GSM base stations 164. Note that this step may not necessarily be performed after UTDOA measurements are performed, but can be performed at any occasion fairly close in time to the UTDOA measurements. The measured results are transferred 167 to the WCDMA parts of the UE 50.

Similarly, the LTE radio part of UE 50 also performs inter-RAT measurements on the LTE network 161, determining e.g. cell IDs of neighbor LTE eNode B's 165 as well as signal strength with respect to these LTE base eNode B's 165. Note that this step may not necessarily be performed after UTDOA measurements are performed, but can be performed at any occasion fairly close in time to the UTDOA measurements. The measured results are transferred 168 to the WCDMA parts of UE 50.

At this time associated measurements that can form GSM and LTE fingerprints are available in the UE 50. Since the UE 50 is active in the WCDMA network 160, but not in the LTE network 161 or the GSM network 162, fingerprint information cannot be provided directly from the UE 50 to the positioning nodes 60 of the LTE network 161 or the GSM network 162.

Instead, the information is signaled to the RNC 24 of the WCDMA network 160 and then further on new proprietary interfaces 169 to the AECID databases in the positioning nodes 60 of the GSM 162 and LTE 161 systems, as well as to the positioning nodes 60 of WCDMA system 160. In a particular embodiment, this signaling is done by first signaling to the WCDMA 160 positioning node 60. This then requires extensions to the existing interfaces at least over the Iupc interface.

In other words, the reporting of the high-precision positioning of the user equipment is an inter-radio-access-technology reporting, providing the high-precision positioning as a reference position for an AECID positioning method for a system with a different access technology system.

As stated above there are two sources of high precision measurements in WCDMA. The A-GPS measurement is valid outdoors, whereas the UTDOA measurement can be successful both indoors and outdoors. Hence the invention can be operated in two situations. In the case A-GPS and UTDOA both are available in the WCDMA network, a failure of A-GPS and success of UTDOA indicates that the UE is indoors, or alternatively outdoors where A-GPS coverage is very limited. Hence, in this case, the WCDMA UTDOA position, fingerprinted with inter-RAT measurements will be useful to populate the GSM and LTE AECID databases, covering up for the fact that no high precision positioning method is available in GSM and LTE (in case OTDOA in LTE is not available). In the case UTDOA is available in the WCDMA network, but A-GPS is not, or alternatively if the UE is not A-GPS capable, fingerprinting with inter-RAT measurements will be useful to populate the GSM and LTE AECID databases for all UTDOA measurements performed in the WCDMA network.

The following inter-RAT measurements are currently standardized for WCDMA; GSM carrier RSSI—Received Signal Strength Indicator, E-UTRA RSRP—Reference signal received power (RSRP), E-UTRA RSRQ—Reference Signal Received Quality (RSRQ) and E-UTRA Carrier Received Signal Strength Indicator (RSSI).GSM carrier RSSI is the wide-band received power within the relevant channel bandwidth. Measurement shall be performed on a GSM BCCH carrier. The reference point for the RSSI shall be the antenna connector of the UE. E-UTRA RSRP is defined as the linear average over the power contributions (in [W]) of the resource elements that carry cell-specific reference signals within the considered measurement frequency bandwidth. For RSRP determination the cell-specific reference signals R0 according to TS 36.211 shall be used. If the UE can reliably detect that R1 is available it may use R1 in addition to R0 to determine RSRP. E-UTRA RSRQ is defined as the ratio N×RSRP/(E-UTRA carrier RSSI), where N is the number of resource blocks of the E-UTRA carrier RSSI measurement bandwidth. The measurements in the numerator and denominator shall be made over the same set of resource blocks. E-UTRA Carrier RSSI comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. The reference point for the RSRQ shall be the antenna connector of the UE. The measurements are performed with respect to a multitude of base stations.

A set of inter-RAT measurements is also defined for LTE used when the measurements are performed from LTE for another RAT (GSM, CDMA, WCDMA) which comprises; UTRA FDD CPICH RSCP, UTRA FDD carrier RSSI, UTRA FDD CPICH Ec/No, GSM carrier RSSI, UTRA TDD carrier RSSI, UTRA TDD P-CCPCH RSCP, CDMA2000 1xRTT Pilot Strength and CDMA2000 HRPD Pilot Strength The fingerprints generated in WCDMA for GSM using the invention may consist of the following information elements; Cell ID, for a set of close cells, Signal strength (e.g., GSM RSSI), for a set of neighbor cells, and in the future, potentially timing measurements (e.g., timing advance, time of arrival, RTT, time difference of arrival, etc.).

The fingerprints generated in WCDMA from LTE using the invention may consist of the following information elements; Cell ID, for a set of neighbor cells, Signal strength (e.g., RSRP) for a set of close cells, Signal quality e.g., RSRQ), for a set of neighbor cells, in the future, path loss, for a set of close cells may become standardized, and also in the future, potentially timing measurements (e.g., timing advance, time of arrival, RTT, time difference of arrival, etc.), and angle of arrival.

This approach also influences the necessary signaling. Here below, an embodiment of UTDOA in WCDMA with GSM or LTE inter-RAT is presented. Note that the order of the signaling steps presented here below only describes one of many embodiments. In alternative embodiment the order of some of the steps may be changed. Furthermore, in further embodiments additional hand-shaking signaling may be introduced.

The positioning node performs a selection of carrier according to the procedures described previously. The UE is transferred to the selected carrier according to the procedures also described previously. The positioning node orders WCDMA UTDOA measurements, by issuing a message to the UTDOA measurement units associated with the NodeBs of the serving cell, and selected neighbor cells over a subset of the Iupc, Iub Iur and proprietary UTDOA positioning interfaces. The positioning node orders fingerprinting measurements by issuing a message to the UE of the serving cell, over a subset of the Iupc, Iur and RRC interfaces. The fingerprinting measurements are typically at least one of Cell IDs and signal strengths. The UTDOA measurement units perform UTDOA measurements according to procedures known in prior art. The UTDOA measurement units report the obtained UTDOA measurements to the positioning node over a subset of the Iupc, Iub Iur and proprietary UTDOA positioning interfaces. The UE performs inter-RAT measurements for GSM or LTE or both. The UE reports the obtained inter-RAT measured results to the positioning node over a subset of the Iupc, Iur and RRC interfaces. The positioning node computes the geographical the geographical UTDOA position of the UE and the radio fingerprint. This is denoted a tagged high precision reference point. The positioning node sends the tagged high precision reference point to the AECID server nodes of a subset of the WCDMA or GSM or LTE systems, where the tagged reference position is stored in the database.

Note that many variants are possible. UTDOA and fingerprinting measurement orders may e.g. be merged to one step. The order of inter-RAT and UTDOA measurements may also be changed. UTDOA measurements may also be performed by radio nodes which are not necessarily location measurement units (LMUs) and the communication interface may exist between LMUs and radio base station. A similar functionality with a similar, though maybe not exactly the same, e.g. due to different interfaces, signaling is straightforward when a RAT different from WCDMA is the serving RAT, e.g. LTE.

When the UTDOA reference points and the associated results of inter RAT measurements are received in the AECID data base handling nodes of GSM and LTE, the fingerprints are created and used to tag each of the reference points. This is identical to the procedure known in prior art. However, the database hierarchy may need to be slightly changed, since there is no serving cell in the fingerprint, the inter-RAT measurements do not determine such a serving cell since there is none due to the fact that the UE is not connected to GSM or LTE. This is actually a preferred embodiment of the present invention, since in the present commercial implementation the serving cell constitute the top hierarchical level, of the AECID database.

An example of such implementation is to have an abstract serving cell of WCDMA associated with e.g. GSM or LTE measurements, when the serving cell is WCDMA. The abstract serving cell may then be, e.g., an indicator indicating that the cell is WCDMA, the true WCDMA cell identification, a pointer to it in the intra-frequency AECID database, or other. Alternatively, each measurement, e.g. in GSM and LTE AECID databases, may be tagged with the RAT information when the serving RAT is different from the measurements RAT. The RAT information may e.g. be cell ID of the serving cell+RAT and cell ID of the measured cell+measured RAT, where the measured RAT indication may be not necessary for intra-frequency.

The concept may also be used for multi-carrier where measurements on multiple frequency carriers or bands may be possible and measurements for different frequencies may be maintained separately in the AECID database, while the serving carrier is not necessarily the same as the measured. In general, the AECID structure may therefore need to be adapted to be able to handle, in addition to intra-frequency: inter-frequency, inter-band, carrier aggregation and inter-RAT measurements, since the requirements, and thus measurement quality, e.g. accuracy and reporting time, may differ for all of them.

Here above, the basic principles of the present invention have been discussed when being implemented in a WCDMA system. However, the same principles are also applicable to other communication systems having other radio access technologies. The present invention may thus, with obvious modifications, apply with any RAN, single- or multi-RAT. Some other RAT examples are HSPA, LTE, LTE-Advanced, UMTS TDD, GSM, cdma2000, WiMAX, and WiFi.

One alternative example is as mentioned an LTE communication system. The three key network elements in an LTE positioning architecture are the LCS Client, the LCS Target and the LCS Server. The LCS Server is a physical or logical entity managing positioning for a LCS Target device by collecting measurements and other location information, assisting the terminal in measurements when necessary, and estimating the LCS Target location. A LCS Client is a software and/or hardware entity that interacts with a LCS Server for the purpose of obtaining location information for one or more LCS Targets, i.e. the entities being positioned. LCS Clients may reside in the LCS Targets themselves, radio node (e.g. eNode B), core network node, PSAP, etc.

An LCS Client sends a request to LCS Server to obtain location information, and LCS Server processes and serves the LCS Client. A positioning request can be originated from the terminal, radio network or core network.

In this view the LCS Target is the UE and the LCS Server constitutes the positioning node.

In LTE, position calculation can be conducted, for example, by a positioning server, e.g. E-SMLC or SLP, or UE. The former approach corresponds to the UE-assisted positioning mode, whilst the latter corresponds to the UE-based positioning mode.

LPPa is a protocol between eNodeB and LCS Server, used for control-plane positioning procedures, assisting user-plane positioning by querying eNode Bs for information and eNode B measurements. This protocol is to be enhanced also to support UL positioning. SUPL protocol may be used as a transport for LPP in the user plane. In the user plane with SUPL, a UE is typically referred to as a SUPL Enabled Terminal (SET). The LCS platform is typically referred to as SUPL Location Platform (SLP).

LCS-AP protocol is between MME and E-SMLC. Positioning is typically triggered via LCS-AP by MME itself or upon request from other nodes, e.g. eNode B, PSAP, etc., or the UE.

Figure 10:
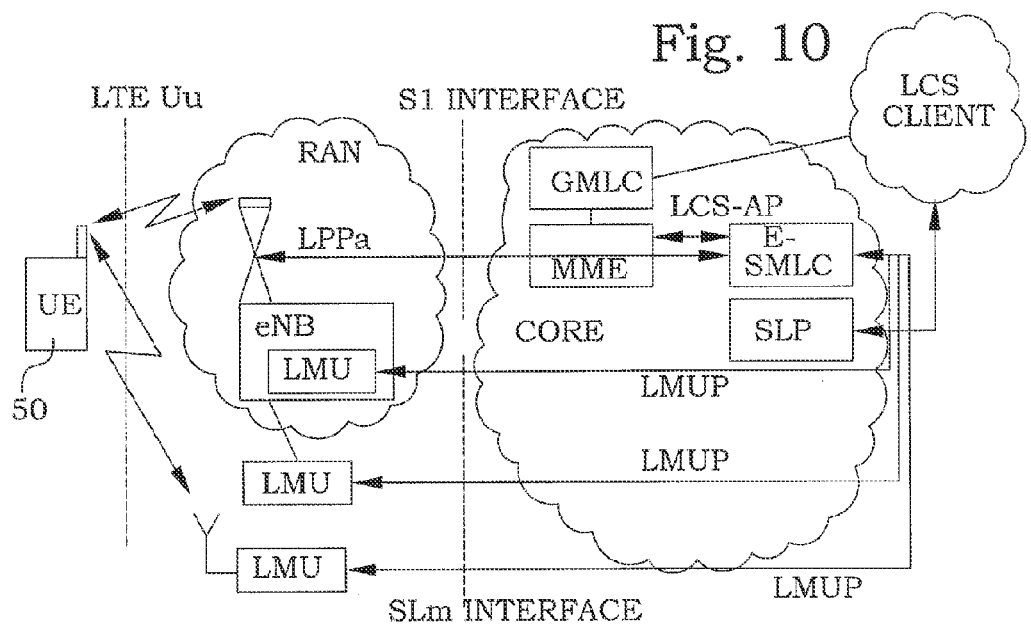
FIG. 10 illustrates schematically an embodiment of a positioning architecture in LTE.

An embodiment of a high-level architecture defined in the current standard is illustrated in FIG. 10. This is focusing on UL positioning support, where the LCS target is a terminal or UE, and the LCS Server is an E-SMLC or an SLP. In the figure, the control plane positioning protocols with E-SMLC as the terminating point and the user plane positioning protocols are shown. SLID may comprise two components, SPC and SLC, which may also reside in different nodes. In an example implementation, SPC has a proprietary interface with E-SMLC, and Llp interface with SLC, and the SLC part of SLP communicates with P-GW (PDN-Gateway) and External. LCS Client.

For UL positioning, the SLm interface, between the E-SMLC and LMU is being standardized for uplink positioning. The interface is terminated between a positioning server (E-SMLC) and LMU. It is used to transport LMUP protocol messages over the E-SMLC-LMU interface.

An LMU may be associated with one or more cells or radio base stations. This means that it may support different frequencies than one associated eNode B. Further, in the view of the above discussed ideas within the present invention, the carrier capability may relate to supported frequencies, but also combinations of and the maximum number of simultaneously measured frequencies.

Although the description is mainly given using the term UE, it should be understood by the skilled in the art that "UE" is a non-limiting term which means any wireless device or node (e.g. PDA, laptop, mobile, sensor, fixed relay, mobile relay or even a small base station that is being positioned when timing measurements for positioning are considered, i.e. a LCS target in general). The invention applies both for UEs capable and not capable of multi-carrier operation.

A cell is associated with a radio node, where a radio node, radio base station or NodeB, used interchangeably in the above description, comprises in a general sense any node transmitting radio signals in downlink and/or receiving signals in uplink, where the signals may be used for positioning measurements, e.g., NodeB, eNodeB, measurement unit (e.g., UTDOA measurement devices are normally mounted at Node Bs, however this is no necessity), LMU, macro/micro/pico base station, home NodeB, relay, remote radio heads, sensor, Inuit-RAT or multi-standard radio base station, or repeater. A multi-carrier capable radio node is a node capable of simultaneous transmitting and/or receiving in multiple frequency carriers, bands, RATs. For LTE, such a node may also be referred to as carrier aggregation capable eNodeB. In another embodiment, the radio node may be a multi-standard radio (MSR) node.

A multi-carrier node may be also the node capable of carrier aggregation for UNITS and LTE, which in addition may also be a multi-standard radio base station.

The positioning node described in different embodiments is a node with positioning functionality such as RNC, network node or base station. In a testing environment, at least positioning node may be simulated or emulated by test equipment. It is an embodiment that an IS technique, e.g., such as described in the invention, may also be used when testing UTDOA positioning requirements. Further, the measurements may apply after IS or IC in the radio node or the test or tested equipment.

In this description, the UTDOA measurement units are described as being co-located to the radio base stations of the main RAT, e.g., NodeBs of the WCDMA system. This is the most common situation. It is however not necessary and the application is not limited to such networks. In a general case, UTDOA measurement units may be standalone or integrated and may or may not share the antenna with other radio nodes.

Figure 11A:
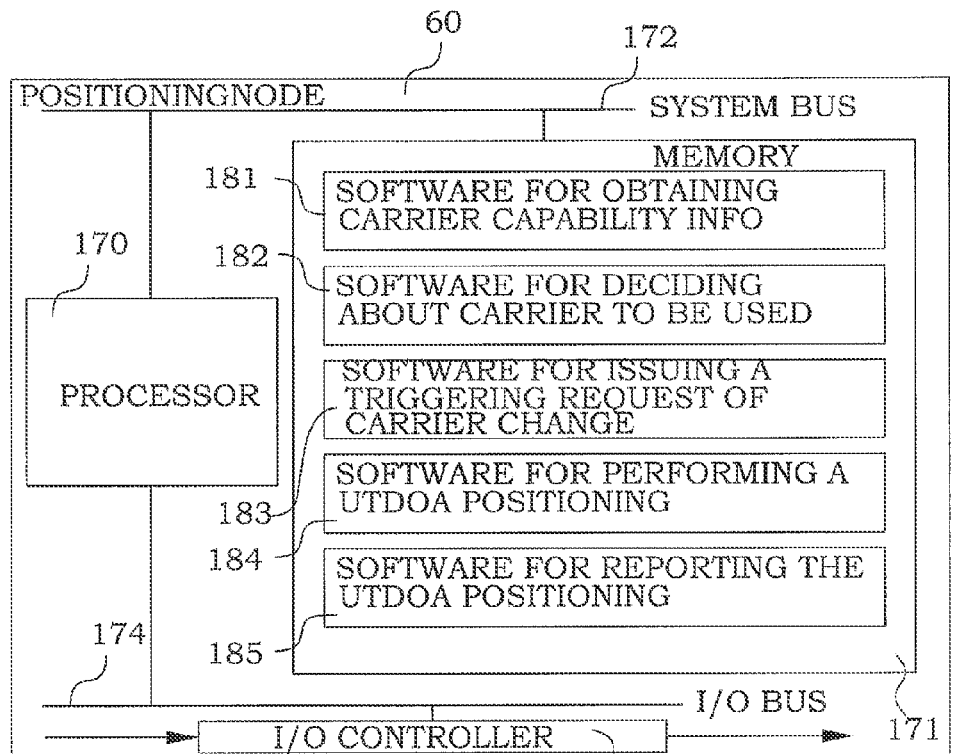
FIGS. 11A-D illustrate embodiments of implementations of radio network nodes.

As an implementation example, FIG. 11A is a block diagram illustrating an example embodiment of a positioning node 60. This embodiment is based on a processor 174, for example a micro processor, a memory 172, a system bus 170, an input/output (I/O) controller 178 and an I/O bus 176. In this embodiment the positioning request as well as signaling from the radio base stations and/or LMUs are received by the I/O controller 178 and stored in the memory 172. The I/O controller 178 also controls the issue of the triggering request as well as the request for positioning measurements to the LMUs. The processor 174 executes a software component 181 for obtaining carrier capability information, a software component 182 for deciding about carrier to be used, a software component 183 for issuing a triggering request of carrier change, a software component 184 for performing a UTDOA positioning and a software component 185 for reporting the UTDOA positioning. This software is stored in the memory 172. The processor 174 communicates with the memory 172 over the system bus 170. Software component 181 may implement the functionality of block 70 in the embodiment of FIG. 3. Software component 182 may implement the functionality of block 76 in the embodiment of FIG. 3. Software component 183 may implement the functionality of block 78 in the embodiment of FIG. 3. Software components 184 and 185 may implement the functionality of block 80 in the embodiment of FIG. 3.

Figure 11B:
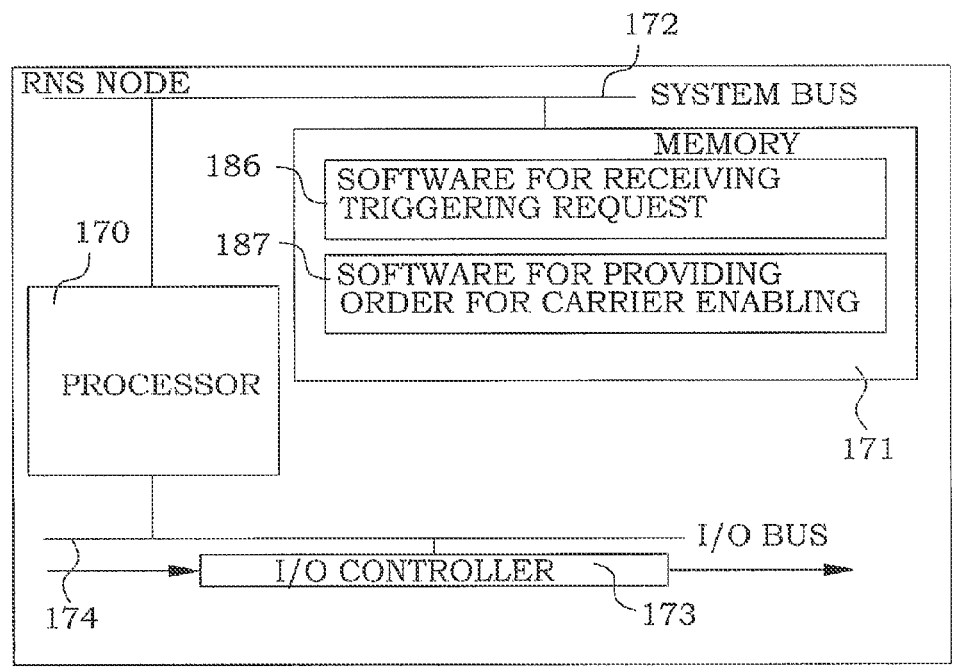

As an implementation example, FIG. 11B is a block diagram illustrating an example embodiment of a node of a radio network subsystem. The node of a radio network subsystem is typically a Radio Network Controller or a Radio Base Station. This embodiment is based on a processor 174, for example a micro processor, a memory 172, a system bus 170, an input/output (I/O) controller 178 and an I/O bus 176. In this embodiment a triggering request is received by the I/O controller 178 and stored in the memory 172. The I/O controller 178 also controls the provision of the order for enabling a UE to utilize a selected carrier. The processor 174 executes a software component 186 for receiving a triggering request, and, a software component 187 for providing an order for enabling a UE to utilize a selected carrier. This software is stored in the memory 172. The processor 174 communicates with the memory 172 over the system bus 170. Software components 186 and 187 may implement the functionality of block 70 in the embodiments of FIGS. 5A and 5B.

Figure 11C:
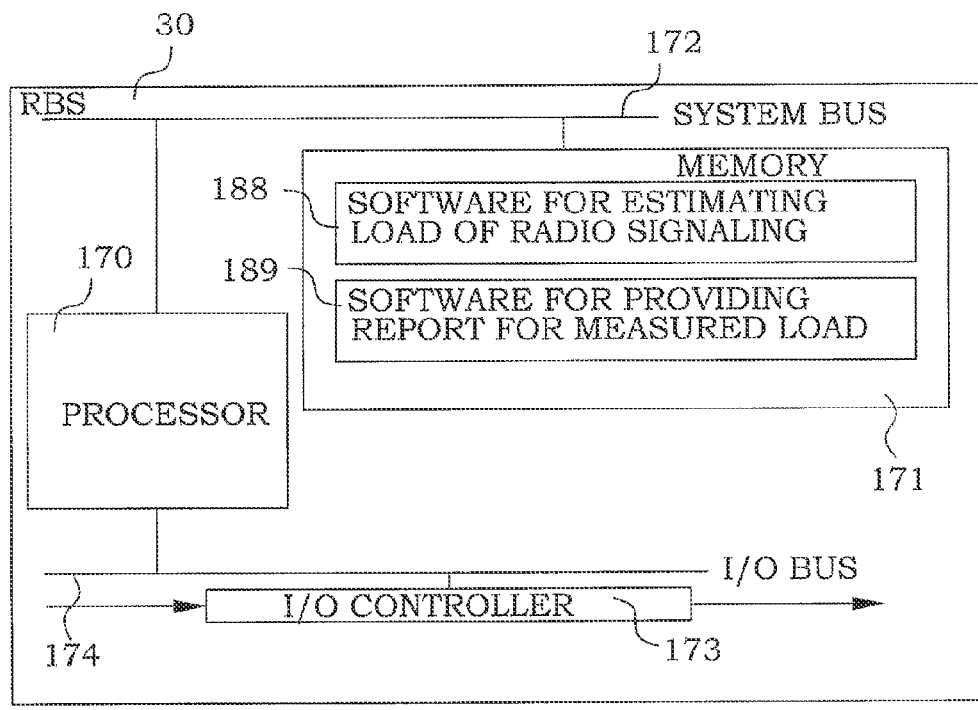

As an implementation example, FIG. 11C is a block diagram illustrating an example embodiment of a Radio Base Station 30. This embodiment is based on a processor 174, for example a micro processor, a memory 172, a system bus 170, an input/output (I/O) controller 178 and an I/O bus 176. In this an inquiry for a load measure may be received by the I/O controller 178 and stored in the memory 172. The I/O controller 178 also controls the reporting of loads to a positioning node. The processor 174 executes a software component 188 for estimating a load of radio signaling, and a software component 189 for providing a report for the measured loads to a positioning node. This software is stored in the memory 172. The processor 174 communicates with the memory 172 over the system bus 170. Software components 188 and 189 may implement the functionality of block 38 in the embodiment of FIG. 4.

Figure 11D:
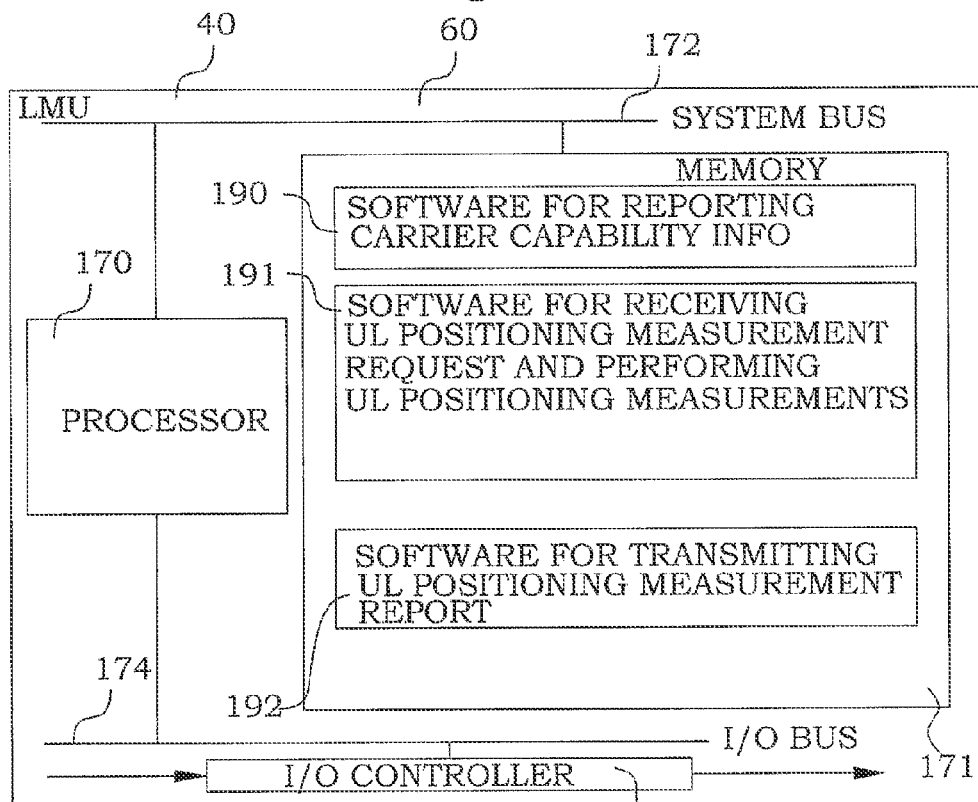

As an implementation example, FIG. 11D is a block diagram illustrating an example embodiment of a LMU 40. This embodiment is based on a processor 174, for example a micro processor, a memory 172, a system bus 170, an input/output (I/O) controller 178 and an I/O bus 176. In this an inquiry for carrier capabilities, a request for uplink positioning measurements as well as uplink radio signals may be received by the I/O controller 178 and stored in the memory 172. The I/O controller 178 also controls the reporting of carrier capabilities and uplink positioning measurements to a positioning node. The processor 174 executes a software component 190 for reporting which carriers that are available for uplink positioning measurements, a software component 191 for receiving a request for uplink positioning measurements and for performing the requested measurements, and a software component 192 for transmitting uplink positioning measurement reports. This software is stored in the memory 172. The processor 174 communicates with the memory 172 over the system bus 170. Software component 190 may implement the functionality of block 46 in the embodiment of FIG. 6. Software components 191 and 192 may implement the functionality of block 44 in the embodiment of FIG. 6.

In one embodiment of the present invention, enhancement of the indoor performance of the AECID positioning method is presented. This performance improvement is achieved by using the new UTDOA positioning method as high precision reference positions. Since UTDOA has no availability problems indoors, it augments A-GPS to achieve complete coverage of AECID for WCDMA, indoors and outdoors. In addition the use of inter-RAT measurements is disclosed with the intention to provide high precision position reference for AECID, also in other RANs of GSM and LTE type. Preferred embodiments of the invention disclose the necessary signaling needed for this purpose.

In different aspects, the invention also discloses new functionality, enhancing the availability of UTDOA in modern WCDMA systems equipped. e.g. with MC functionality. Accounting for the uplink RoT, pathloss and antenna direction to select a best carrier for UTDOA positioning will improve UTDOA positioning success probability, in particular in high uplink load. This is crucial to meet E-911 requirements in North America. It may also be the case that UTDOA is only available on a subset of the available WCDMA carriers. In this case the invention introduces in preferred embodiments the signaling needed to allow a handover to the appropriate carrier for UTDOA positioning. This vastly improves the availability of UTDOA positioning, e.g. in situation with UL MC in WCDMA.

The description here above proposes the use of UTDOA high-precision measurements for use as reference positions, primarily indoors, for the AECID positioning method. Furthermore, the invention proposes signaling means between WCDMA and GSM/LTE as well as between LTE and WCDMA/GSM so that said high precision reference measurements can be utilized also to populate AECID databases in GSM/LTE and WCDMA/GSM databases, respectively.

Now, there are problems with UTDOA positioning in modern variants of the WCDMA system, equipped with many carriers and in particular fast base station controlled multi-carrier solutions. The description, here above discloses methods for selection of the most appropriate carrier to use for UTDOA positioning measurement. In doing so the invention discloses new capability information and associated signaling that allows the positioning node to determine for which carriers the UTDOA measuring hardware is capable of performing the positioning measurements. In case more than one carrier is available, the description further discloses means to assess the interference situation in terms of the RoT or noise rise, for the reference UTDOA measurement unit and for neighbor sites where detections are expected. The so obtained interference situation is signaled, using new signaling to a node, preferably the positioning node, where a novel algorithm, is used to determine the carrier that is best to use for UTDOA positioning measurements. It is noted that interference suppressing or interference cancellation receivers may be applied at least in the reference receiver step. In that case it is the load after IS or IC—the invention therefore discloses algorithms for measurement of the RoT after IS and IC receivers.

The UTDOA positioning procedure then proceeds with UTDOA measurements, position calculation and reporting of the position, according to prior art technology.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

APPENDIX A

Positioning Methods

Cell ID Positioning

All cellular systems are divided into cells, served by one specific RBS. Each RBS may serve more than one cell. The important point from a positioning and navigation perspective is that the cell where a specific UE is located is known in the cellular system. Hence, after determination of the geographical area covered by a specific cell, it can be stated that the UE is located somewhere within said geographical area, as long as it is connected and the reported cell identity of the serving cell is equal to the cell identity of the particular geographical area. The accuracy of the cell identity positioning method is limited by the size of the cell, something that prevents it from being used in more sophisticated navigation applications. Its main advantages include a very low response time as well as the fact that it is widely spread and always available where there is cellular coverage. The cell identity method is also straightforward to implement and has no UE impact.

Round Trip Time Positioning

The advantages of the Cell ID positioning has lead to an interest for the development of E-cell ID (enhanced cell identity) positioning methods that aim at enhancing the accuracy of the basic cell identity method at the same time as the advantages of the method are retained. The most important of these methods is obtained when cell ID is augmented with Round Trip Time (RTT) measurements, in WCDMA, or Timing Advance (TA) measurements, in GSM. This principle for enhanced cell identity positioning aims at combining the cell extension model, e.g. a polygon, with a distance measure. Briefly, the travel time of radio waves from the RBS to the UE and back is measured. The distance from RBS to UE then follows from the formula:

$$r = c\frac{RTT}{2}, \quad (A1)$$

where RTT is the round trip time and where c is the speed of light. The MT measurement alone defines a circle, or if the inaccuracy is accounted for, a circular strip around the RBS. By combining this information with the cell polygon, left and right angles of the circular strip can be computed.

A-GPS Positioning

Assisted GPS (A-GPS) positioning is an enhancement of the global positioning system (GPS). GPS reference receivers attached to a cellular communication system collect assistance data that, when transmitted to GPS receivers in UEs connected to the cellular communication system, enhance the performance of the GPS terminal receivers.

Typically, A-GPS accuracy can become as good as 10 meters also without differential operation. The accuracy becomes worse in dense urban areas and in particular indoors, where the sensitivity is most often not high enough for detection of the very weak signals from the GPS satellites. A-GPS or other high precision positioning measurements can besides a direct positioning also be used in order to provide reference measurements for AECID positioning. Further details of this appear below.

AECID Positioning

The AECID method enhances fingerprinting positioning performance by extending the number of radio properties that are used, where at least cell IDs and round trip time (RTT) measurements may be used in addition to received signal strengths. The corresponding databases are automatically built up by collecting high precision positions, e.g. obtained by A-GPS positions, tagged with measured radio properties. The AECID positioning method was first disclosed in the published international patent application WO2007/043915T.

The first main step of the AECID algorithm is a tagging of high-precision position results, e.g. A-GPS measurements, with at least one of Cell IDs of detected cells, auxiliary connection information and quantized auxiliary measurements. The auxiliary connection information can for instance be the radio access bearer or time. The quantized auxiliary measurements may e.g. be RTT or signal strength measurements. All high precision measurements with the same tag are collected in high precision measurement clusters. A tagged polygon is calculated. The tagged polygon contains a pre-specified fraction of the clustered high precision positioning measurements in the interior. This thereby provides a polygon with a known confidence value. Note that the confidence is the probability that the UE is actually located in the reported region. The tagged polygons are stored in a database of polygons.

When an AECID positioning is to be performed, the first step is to determine at least one of Cell IDs of detected cells, auxiliary connection information and quantized auxiliary measurements. The tag is formed, defined by these determined items. The polygon, corresponding to the tag is retrieved and reported.

UTDOA Positioning

The major conceptual difference between Uplink Time Difference Of Arrival (UTDOA) and Observed Time Difference Of Arrival (OTDOA) is that the latter requires multiple transmit points whilst the former utilizes multiple receive points at different locations, typically RBS locations, although the position calculation principle is the same.

Assuming that the measurement are successful for a number of base stations, the following relations between the measured Times Of Arrival (TOA) in the RBSs, the transmission time from the UE and the distances between the UE and the measurement locations, typically the RBSs follow:

$$t_{TOA,1} + b_{clock} = T_{transmit} + \|r_1 - r_{Terminal}\|/c \quad (A2)$$

$$\vdots$$

$$t_{TOA,n} + b_{clock} = T_{transmit} + \|r_n - r_{Terminal}\|/c.$$

Here $t_{TOA,i}$, i=1, . . . , n denotes the measured TOAs in the known measuring locations $r_i$, i=1, . . . , n, $T_{transmit}$ denotes the transmission time from the UE and c is the speed of light. The boldface quantities are the vector locations of the RBSs and the UE. $b_{clock}$ denotes the unknown clock bias of the UE with respect to cellular communication system time. Now, in Time Difference Of Arrival (TDOA) positioning, TOA differences with respect to the own site are formed according to:

$$\begin{aligned}t_{TDOA,2} &= t_{TOA,2} - t_{TOA,1} \\ &= T_{transmit} - b_{clock} + \|r_2 - r_{Terminal}\|/c - \\ &\quad \|r_1 - r_{Terminal}\|/c\end{aligned} \quad (A3)$$

$$\vdots$$

$$\begin{aligned}t_{TDOA,n} &= t_{TOA,n} - t_{TOA,1} \\ &= T_{transmit} - b_{clock} + \|r_n - r_{Terminal}\|/c - \\ &\quad \|r_1 - r_{Terminal}\|/c.\end{aligned}$$

In these n−1 equations, the left hand sides are known, with some additional measurement error, provided that the time of transmission difference between the network and UE time can be measured. This is normally achieved with dedicated hardware so called Location Measurement Units (LMUs) or by other procedures. In case of a synchronized network the difference is known. Further the locations of the measurement locations, $r_i$, i=1, . . . , n, can be surveyed, to within a few meters and so they are known as well. What remains unknown is the terminal location, i.e.:

$$r_{Terminal} = (x_{Terminal} y_{Terminal} z_{Terminal})^T \quad (A4)$$

In the more common case a two dimensional positioning is performed the unknown position is instead:

$$r_{Terminal} = (x_{Terminal} y_{Terminal})^T \quad (A5)$$

It then follows that at least three time of arrival differences are needed in order to find a 3D terminal position and that at least two time of arrival differences are needed in order to find a 2D terminal position. This, in turn, means that at least four sites need to be detected for 3D terminal positioning and at least three sites need to be detected for 2D terminal positioning. In practice, accuracy can be improved if more measurements are collected and a maximum likelihood solution is introduced. There may also be multiple (false) solutions in cases where only a minimum number of sites are detected.

APPENDIX B

Advanced Receivers, Uplink Load Estimation and Signaling

In this presentation, the load measure that is relevant for detection performance is of interest. This load measure is given by various versions of the "rise over thermal".

Uplink Load Estimation with RAKE Receivers

It is e.g. known in prior art that without advanced interference suppressing (IS) receivers and interference cancellation (IC), the load defined at the antenna connector is given by the noise rise, or rise over thermal, RoT(t), defined by:

$$RoT(t) = \frac{RTWP(t)}{N}, \quad (B1)$$

where N is the thermal noise level as measured at the antenna connector. The definition of RTWP(t) is the total wideband power:

$$RTWP(t) = \sum_{k=1}^{K} P_k(t) + I(t) + N, \quad (B2)$$

also measured at the antenna connector. Here $P_u(t)$, $u=1, \ldots, U$, denotes the power of uplink user u, and $I(t)$ denotes the power as received from neighbor cells of the WCDMA system.

A problem that now needs to be addressed is that the signal reference points are, by definition at the antenna connector. The measurements are however obtained after the analogue signal conditioning chain, in the digital receiver. The analogue signal conditioning chain may unfortunately introduce a scale factor error of about 1-3 dB. Fortunately, all powers of the cell are almost equally affected by the scale factor error so when the RoT is calculated, the scale factor error is cancelled as:

$$RoT^{DigitalReceiver}(t) = \frac{RTWP^{DigitalReceiver}(t)}{N^{DigitalReceiver}(t)} \quad (B3)$$

$$= \frac{\gamma(t)RTWP^{Antenna}(t)}{\gamma(t)N^{Antenna}(t)}$$

$$= RoT^{Antenna}(t).$$

The RoT can hence be measured in the receiver. The major difficulty of any RoT estimation algorithm still remains though, namely to separate the thermal noise power from the interference from neighbor cells. That this is troublesome can be seen from the following equation, where $E[\ ]$ denotes statistical expectation, and where $\Delta$ denotes the variation around the mean.

$$I^N(t)+N(t)=E[I^N(t)]+E[N(t)]+\Delta I^N(t)+\Delta N(t), \quad (B4)$$

The fundamental problem can now be clearly seen. Since there are no measurements available in the RBS that are related to the neighbor cell interference, a linear filtering operation can at best estimate the sum $E[I^N(t)]+E[N(t)]$. This estimate cannot be used to deduce the value of $E[N(t)]$. The situation is the same as when the sum of two numbers is available. Then there is no way to figure out the values of the individual numbers. This issue has been analyzed rigorously for the RoT estimation problem and it is proved that the noise power floor is not mathematically observable. Non-linear algorithms that provide approximate estimates of the noise floor are therefore used.

Sliding Window Noise Floor Estimation

A RoT estimation algorithm is described in WO2007/024166. The algorithm estimates the RoT. The main problem solved by the estimation algorithm is the accurate estimation of the thermal noise floor N. Since it is not possible to obtain exact estimates of this quantity due to the neighbor cell interference, the estimator therefore applies an approximation, by consideration of the soft minimum as computed over a relative long window in time. It is important to understand that this estimation relies on the fact that the noise floor is constant over very long periods of time, disregarding the small temperature drift.

Recursive Noise Floor Estimation

The sliding window algorithm of the above section has the disadvantage of requiring a large amount of storage memory. This becomes particularly troublesome in case a large number of instances of the algorithm are needed, as may be the case when IC is introduced in the uplink.

To reduce the memory consumption a recursive algorithm was disclosed in the published International patent application WO2008/039123 A1. That algorithm reduces the memory requirements of the sliding window scheme discussed above at least by a factor of 100.

The invention disclosed here is applicable both to the sliding window RoT estimation algorithm and the recursive algorithm.

Uplink Load Estimation with G-Rake+ and Chip Equalizer Receivers

G-Rake+ Interference Suppression

The difference with G-rake+ as compared to conventional RAKE, is that each user sees a reduced level of interference, immediately after the so called weight combining step. In G-rake+, a covariance matrix $\hat{R}_u$, $u=1, \ldots, U$, with the order equal to the number of fingers is first estimated to capture the interference. The codes not used by the present user u may be used in order to estimate $\hat{R}_u$. The GRAKE+ receiver uses the estimated covariance matrix that models the interference for computation of the combining weights for the users u, $u=1, \ldots, U$.

$$\hat{R}_u \hat{w}_u = \hat{h}_u, \; u=1, \ldots, U \quad (B5)$$

where $\hat{h}_u$, $u=1, \ldots, U$, is the net channel response of user u and where $\hat{w}_u$ are the combining weights. The effect of the above equation is that GRAKE+ essentially whitens the correlated interference and removes large spectral peaks from interferers at certain finger locations and, for certain antenna elements. Note that GRAKE+ is still a linear receiver.

A First Attempt to Measure G-Rake+ RoT

The published International patent application WO2010/144004A1 discloses means for estimation of the RoT, as seen by a user after G-rake+. This patent application defines a new signal after G-rake+ processing and evaluates RoT for that signal. However, the algorithm of WO2010/144004A1 requires inversion of the impairment matrix of each user and is too computationally demanding to be preferred presently.

Frequency Domain Pre-Equalization

The Frequency Domain Pre Equalizing (FDPE) receiver is another interference suppressing receiver. It is relevant here since it too affects the measurement of uplink load. The main advantages associated with this structure are claimed to be that the FDPE structure gives significant IS gains, that the FDPE structure achieves IS for all users simultaneously, thereby reducing the computational complexity as compared to the G-rake+ structure that performs processing individually for all users. The additional processing blocks are inserted in the uplink receiver structure that is already in place, thereby reducing development costs. The fast Fourier transform (FFT) accelerator hardware developed for LTE can be reused, thereby creating further synergies for the new DUS HW of the RBS. The FDPE algorithm performs furthermore interference whitening in the frequency domain.

To explain this in detail, the following time domain signal model can be used:

$$v(t) = \sum_{l=0}^{L-1} h(l)z(t-l) + \eta_v(t). \quad (B6)$$

Here v is the received (vector due to multiple antennas) signal, with chip sampling rate, h is the radio channel net response, z is the desired (transmitted) signal and $\eta_v$ denotes thermal noise and interference. t denotes discrete time.

Taking the Fourier transform, translates the time domain equation into:

$$V(m)=H(m)Z(m)+N(m), \quad (B7)$$

where the quantities are the discrete Fourier transform of the corresponding time domain quantities. Now, a whitening filter can be applied in the frequency domain. It is well known that the filter that minimizes the mean square error (the MMSE solution) is given by:

$$W_{MMSE}(m) = \left(\hat{R}_d(m)\right)^{-1} \hat{H}(m) \quad (B8)$$

$$= \left(\begin{bmatrix} R_{0,0}(m) & R_{0,1}(m) & \cdots & R_{0,N_r-1}(m) \\ R_{1,0}(m) & R_{1,1}(m) & & \\ \vdots & & \ddots & \\ R_{N_r-1,0}(m) & & & R_{N_r-1,N_r-1}(m) \end{bmatrix}\right)^{-1} \begin{bmatrix} \hat{H}_0(m) \\ \hat{H}_1(m) \\ \\ \hat{H}_{N_r-1}(m) \end{bmatrix}$$

where $\hat{R}_d(m)$ is an estimate of the covariance matrix of $V(m)$. Using a Cholesky decomposition, the covariance matrix between the antenna elements can be factored as:

$$L(m) \cdot L^H(m) = \hat{R}_d(m). \quad (B9)$$

The idea behind FDPE is to exploit this factorization and write:

$$W_{MMSE}(m)=(L^H(m))^{-1}((L(m))^{-1}\hat{H}(m))=W_{pre}(m)((L(m))^{-1}\hat{H}(m)) \quad (B10)$$

so that the desired signal in the frequency domain becomes MMSE pre-equalized in the frequency domain, i.e. given by:

$$Z_{pre}(m)=W_{pre}(m)V(m). \quad (B11)$$

This is a user independent processing, which is the same for all users. Hence the wideband received signal is transformed to the frequency domain, and the covariance matrix is computed and Cholesky factored, after which the whitened signal is computed. The signal is then transformed back to the time domain where it is further processed for each user.

Frequency Domain Equalization

The FDE algorithm performs equalization and interference suppression in the frequency domain. Contrary to the FDPE, the FDE processing is performed individually for each user. To explain the FDE in, the following time domain signal model is used again:

$$v(t) = \sum_{l=0}^{L-1} h(l)z(t-l) + i(t) + n^{termnal}(t). \quad (B12)$$

Here v is the received (vector due to multiple antennas) signal, h is the radio channel net response, z is the desired (transmitted) signal, i(t) is the interference and $n^{thermal}(t)$ denotes thermal noise. t denotes discrete time.

Taking the Fourier transform, translates the above equation into:

$$V(m)=H(m)Z(m)+I(m)+N^{thermal}(m), \quad (B13)$$

where the quantities are the discrete Fourier transform of the corresponding time domain quantities.

Now MMSE equalization can be performed on V(m), separately for each user (different from the FDPE structure). For this purpose, the channel is estimated using the pilot signal. Below this fact is emphasized by using the subscript $_u$ for user u.

However, rather than computing the filter coefficients in the time domain and then transforming to the frequency domain, the MMSE filter coefficients can be directly computed as:

$$W_u(m)=H_u^H(m)(H_u^H(m)H_u(m)+I_u(m)I_u^H(m)+ \\ (N^{thermal}(m))^H N^{thermal}(m))^{-1}, u=1, \ldots, U \quad (B14)$$

where the thermal noise power floor matrix estimate, can be obtained by any of the algorithms for noise floor estimation described above, and where $H_u(m)$ is the sampled channel frequency response vector for user u. The use of frequency domain computation is less computationally complex and represents the preferred embodiment for implementation of the FDE.

Finally, the equalized signal is computed by a frequency domain multiplication as:

$$Z_{FDE}(m)=W_u(m)V(m), u=1, \ldots, U \quad (B15)$$

after which the inverse FFT is applied to get the signal $z_{FDE,u}(t)$. After this step processing proceeds as in a conventional WCDMA system. The processing is repeated for all users.

Uplink Load Signaling

The NBAP and RNSAP protocols allow for signaling of:
Received total wideband power (RTWP(t)).
The estimated thermal noise floor.
The received scheduled enhanced uplink power (RSEPS(t)).

The details of the encoding of these messages appear in 3GPP standards. They are not important as such for the present invention disclosure. The signaling hence breaks the estimated RoT into two pieces, the estimated noise floor and the total wideband power. Note that specification states that it is the quantities at the antenna connector that are to be signaled, signaling of other related quantities in these containers represents a proprietary solution.

APPENDIX C

G-Rake+ RoT

Measurement of load after IS in G-rake+ and chip equalizers

To see how load can be estimated taking account of the G-rake+ IS gain, the powers after weight combining are studied at sufficient statistics level. First, it is assumed that the received signal of user u on code $k \in \Omega_u$ is:

$$y_{u,k}=h_u s_{u,k}+I_{u,k}+N_{u,k}, u=1, \ldots, U, k=1, \ldots, K \quad (C1)$$

where $\Omega_u$ the set of codes for user u, $s_{u,k}$, u=1, ..., U, k=1, ..., K, is the signal, $I_{u,k}$, u=1, ..., U, k=1, ..., K, is the interference and $N_{u,k}$, u=1, ..., U, k=1, ..., K, is the (thermal) noise signal (not power) and, $\hat{h}_u$, u=1, ..., U, is the net channel response of user u. G-rake+ then performs weight combining to get the sufficient statistics $z_{u,k}^{G+}$ according to the equations:

$$\hat{z}_{u,k}^{G+}=\hat{w}_u^H y_{u,k}=\hat{w}_u^H \hat{h}_u s_{u,k}+\hat{w}_u^H I_{u,k}+\hat{w}_u^H N_{u,k}, \\ u=1, \ldots, U, k=1, \ldots, K. \quad (C2)$$

$$\hat{R}_u \hat{w}_u = \hat{h}_u, u=1, \ldots, U \quad (A3)$$

Here $\hat{w}_u$ are the combining weights of G-rake+, whereas the estimated covariance matrix that models the interference for computation of the combining weights for the users u is given by $\hat{R}_u$. Equations (C2) and (C3) have two main implications; one indicating how power measurements can be done and one indicating the scale factor problem which is addressed below.

Using equation (C2) it can be seen that the effect of the G-rake+weight combining is the same as if an artificial received signal $z_{u,k}^{G+}$ would be processed. Since these signals obviously reflect the weight combining and thereby the IS gains of the G-rake+ receiver, $z_{u,k}^{G+}$, u=1, . . . , U, k=1, . . . , K, is believed to be a relevant starting point for load estimation.

As stated above, the load estimator operates by processing of the RTWP and in the future possibly the RSEPS. For this reason, similar power signals need to be formed from the $z_{u,k}^{G+}$, u=1, . . . , U, k=1, . . . , K, in order to reuse the load concept applied without IS.

Note that it is not clear if the proposed approach to reuse the load concept applied without IS is precise or optimal. At the present time it is the only approach available.

User Powers Associated with the G-Rake+ Sufficient Statistics

Squaring (C2) and assuming a low degree of correlation between its three terms, leads to:

$$|\hat{z}_{u,k}^{G+}|^2 \approx \hat{w}_u^H \hat{h}_u \hat{h}_u^H \hat{w}_u |s_{u,k}|^2 + \hat{w}_u^H I_{u,k} I_{u,k}^H \hat{w}_u + \hat{w}_u^H N_{u,k} N_{u,k}^H \hat{w}_u \equiv S_{u,k}^{G+} + I_{u,k}^{G+} + N_{u,k}^{G+}, u=1, \ldots, U, k=1, \ldots, K. \quad (C4)$$

The rise over thermal, as seen by user u is now, by definition:

$$RoT_u^{G+} \equiv \frac{S_u^{G+} + I_u^{G+} + N_u^{G+}}{N_u^{G+}} \quad (C5)$$

$$S_u^{G+} = \sum_{k \in \Omega_u} S_{u,k}^{G+} \quad (C6)$$

$$I_u^{G+} = \sum_k I_{u,k}^{G+} \quad (C7)$$

$$N_u^{G+} = \sum_k N_{u,k}^{G+}. \quad (C8)$$

Note that it is unclear how to distinguish between $S_{u,k}^{G+}$, $I_{u,k}^{G+}$ and $N_{u,k}^{G+}$ for $k \in \Omega_u$. The algorithm disclosed here avoids many of these problems, since both $I_{u,k}^{G+}$ and $N_{u,k}^{G+}$ are computed from other quantities. Note further that in (C4) $S_{u,k}^{G+} = \hat{w}_u^H \hat{h}_u \hat{h}_u^H \hat{w}_u |s_{u,k}|^2$, i.e. the power is expressed starting with the (transmitted) code power $|s_{u,k}|^2$. The same quantity $S_{u,k}^{G+}$ also be expressed starting with the antenna power $|e_{u,k}|^2 = \hat{h}_u^H \hat{h}_u |s_{u,k}|^2$, in which case $S_{u,k}^{G+} = \hat{w}_u^H \hat{w}_u |e_{u,k}|^2$. This latter setting is used in the link simulations used for validation of the concept. The algorithmic development that follows does however use the definitions (C4)-(C8).

Computation of $S_u^{G+}$

The signal power is computed directly from (C6). Using (C4) and (C6) then results in:

$$S_u^{G+} = \sum_{k \in \Omega_u} S_{u,k}^{G+} \quad (C9)$$

$$= \hat{w}_u^H \hat{h}_u \hat{h}_u^H \hat{w}_u \sum_{k \in \Omega_u} |s_{u,k}|^2$$

$$= \hat{w}_u^H \hat{h}_u \hat{h}_u^H \hat{w}_u \hat{E}_{s,u}$$

$$= |\hat{w}_u^H \hat{h}_u|^2 \hat{E}_{s,u},$$

$$u = 1, \ldots, U.$$

Note that computation of the signal energy $\hat{E}_{s,u}$ is quite intricate, including e.g. the involved beta factors.

Computation of $N_u^{G+}$

White Noise Power Floor

The idea here is to rely on the baseline thermal noise power floor estimation algorithm to estimate the thermal noise power floor before any G-rake+ processing. A main problem then arises since the thermal noise is scaled by $\hat{w}_u$ when the sufficient, statistics is evaluated. This means that the thermal noise power level will no longer appear constant.

The approach taken here to circumvent this problem builds on the calculation of the scale factor by which the thermal noise power is scaled. To compute this quantity, first note that when the wideband thermal noise power floor is estimated before G-rake+ processing, e.g. with the baseline noise floor estimator, the following quantity is estimated:

$$\hat{N} = \frac{1}{M} \sum_{m=1}^{M} \sum_{k=1}^{K} (N_{u,k}^m)^H N_{u,k}^m \xrightarrow[M \to \infty]{} KE[(N_{u,k})^H N_{u,k}] \quad (C10)$$

$$= KP_{N_{u,k}}$$

$$= K \frac{1}{K} P_N$$

$$= N_0,$$

where $N_0$ is the thermal noise power floor and where m is the sample summation index. The power at the sufficient statistics signal processing point is however:

$$\hat{N}^{G+} = \frac{1}{M} \sum_{m=1}^{M} \sum_{k=1}^{K} (\hat{w}_u^H N_{u,k}^m)^H \hat{w}_u^H N_{u,k}^m \quad (C11)$$

$$= \frac{1}{M} \sum_{m=1}^{M} \sum_{k=1}^{K} tr((\hat{w}_u^H N_{u,k}^m)^H \hat{w}_u^H N_{u,k}^m)$$

$$= \frac{1}{M} \sum_{m=1}^{M} \sum_{k=1}^{K} tr(\hat{w}_u^H N_{u,k}^m (\hat{w}_u^H N_{u,k}^m)^H)$$

$$= \frac{1}{M} \sum_{m=1}^{M} \sum_{k=1}^{K} tr(\hat{w}_u^H N_{u,k}^m (N_{u,k}^m)^H \hat{w}_u)$$

$$= tr\left(\sum_{k=1}^{K} \hat{w}_u^H \left(\frac{1}{M} \sum_{m=1}^{M} N_{u,k}^m (N_{u,k}^m)^H\right) \hat{w}_u\right) \xrightarrow[M \to \infty]{}$$

$$tr(K \hat{w}_u^H E[N_{u,k}(N_{u,k})^H] \hat{w}_u)$$

$$= tr(K \hat{w}_u^H (N_0/K) I \hat{w}_u)$$

$$= \hat{w}_u^H \hat{w}_u N_0$$

$$= \hat{w}_u^H \hat{w}_u \hat{N}.$$

The conclusion is that the thermal noise floor at the sufficient statistics signal point can be obtained from the noise floor estimate before G-rake+ processing, by a multiplication with the scale factor:

$$\kappa_u^{G+} = (\hat{w}_u)^H \hat{w}_u, \; u=1, \ldots, U. \tag{C12}$$

This gives:

$$N_u^{G+} = \kappa_u^{G+} \hat{N}, \; u=1, \ldots, U \tag{C13}$$

The computation of the scale factor requires an additional inner product for each user.

Colored Noise Power Floor

This subsection discusses the case where the result of (C10) is replaced by the more general assumption:

$$\frac{1}{M}\sum_{m=1}^{M}\sum_{k=1}^{K} N_{u,k}^m (N_{u,k}^m)^H \xrightarrow[M\to\infty]{} KE[N_{u,k}(N_{u,k})^H] = K\frac{N_0}{K} R_N = N_0 R_N, \tag{C14}$$

i.e. the case when sampling is fast enough to reflect the shape of the uplink spectrum. In this case it follows that (C10) is transformed to:

$$\hat{N} = \frac{1}{M}\sum_{m=1}^{M}\sum_{k=1}^{K}(N_{u,k}^m)^H N_{u,k}^m \xrightarrow[M\to\infty]{} KE[(N_{u,k})^H N_{u,k}]$$
$$= Ktr(E[N_{u,k}(N_{u,k})^H])$$
$$= N_0 tr(R_N) \tag{C15}$$

Furthermore, (C11) is transformed into:

$$\hat{N}^{G+} = N_0 tr(\hat{w}_u^H R_N \hat{w}_u). \tag{C16}$$

The end result in this case is the scale factor:

$$\kappa_u^{G+} = \frac{tr(\hat{w}_u^H R_N \hat{w}_u)}{tr(R_N)} \tag{C17}$$

Computation of $I_u^{G+}$ Using Available SINRs

The code power to interference ratio is:

$$(C/I)_u^{G+} = \frac{S_u^{G+}}{I_u^{G+} + N_u^{G+}}, \; u=1, \ldots, U. \tag{C18}$$

It can be noted that in (C18), all quantities except $I_u^{G+}$ have been computed, see (C11) and (C13). Using these quantities, (C18) can be solved for $I_u^{G+}$, giving:

$$I_u^{G+} = \frac{S_u^{G+}}{(C/I)_u^{G+}} - \kappa_u^{G+}\hat{N}, \; u=1, \ldots, U. \tag{C19}$$

The quantity $(C/I)_u^{G+}$ can be directly related to SINR. This is performed as:

$$(C/I)_u^{G+} = \frac{(\beta_{u,DPCCH}^2 + \beta_{u,EDPCCH}^2 + n_{u,codes}\beta_{u,EDPDCH}^2)}{\beta_{u,DPCCH}^2 SF_{u,DPCCH}} \tag{C20}$$

-continued $$SINR_u^{G+} = \frac{\beta_{u,effective}^2}{SF_{u,DPCCH}} SINR_u^{G+}$$

which gives $$I_u^{G+} = \frac{S_u^{G+}}{(C/I)_u^{G+}} - \kappa_u^{G+}\hat{N} = \frac{SF_{u,DPCCH}}{\beta_{u,effective}^2} \frac{S_u^{G+}}{SINR_u^{G+}} - \kappa_u^{G+}\hat{N}. \tag{C21}$$

Computation of $RoT_u^{G+}$

When (C9), (C13) and (C21) are inserted in (C5), the end result becomes:

$$RoT_u^{G+} \equiv \frac{S_u^{G+} + I_u^{G+} + \kappa_u^{G+}\hat{N}}{\kappa_u^{G+}\hat{N}} \tag{C22}$$
$$= \frac{S_u^{G+}}{\kappa_u^{G+}\hat{N}}\left(1 + \frac{SF_{u,DPCCH}}{\beta_{u,effective}^2}\frac{1}{SINR_u^{G+}}\right),$$

$u, 1, \ldots, U.$

These measures, for each user, are then combined into an uplink measure as outlined below. Note that (C22) provides some interesting insights. When SINR is high then the RoT for the user is essentially determined by the remaining own power of the user—the RoT then increases when the SINR gets worse.

Uplink Load Measure for G-Rake+

It is clear that that the user that sees the maximum total load is the one worst off in terms of coverage and stability. That user is hence used to address the load of the UL of the cell. The worst case load is defined by the equations:

$$u_{max} = \arg\max_u (RoT_u^{G+}) \tag{C23}$$

$$\max(RoT_u^{G+}) = RoT_{u_{max}}^{G+} \tag{C24}$$

APPENDIX D

FDPE RoT

The Signal after FDPE

Using (B11) and (B13) results in:

$$Z_{pre}(m) = W_{pre}(m)H(m)Z(m) + W_{pre}(m)I(m) + W_{pre}(m)N^{thermal}(m). \tag{D1}$$

Here $Z_{pre}(m)$ denotes the pre-equalized wideband signal in the frequency domain, $W_{pre}(m)$ denotes the wideband pre-equalizing filter in the frequency domain, $H(m)$ denotes the wideband net channel response in the frequency domain, $Z(m)$ denotes the wideband transmitted signal in the frequency domain, $I(m)$ denotes the wideband neighbor cell interference in the frequency domain and $N^{thermal}(m)$ denotes the wideband thermal noise floor signal in the frequency domain. The equation (D1) is readily transformed to the time domain with an inverse discrete Fourier transformation, rendering:

$$z_{pre}(t) = (w_{pre}h)(t)*z(t) + w_{pre}(t)*n^{thermal}(t) \tag{D2}$$

where the star denotes (multi-dimensional) convolution $z_{pre}(t)$ denotes the pre-equalized wideband signal in the time domain, $w_{pre}(s)$ denotes the wideband finite impulse response of the pre-equalizing filter in the time domain, h(i) denotes the wideband finite impulse response net channel response in the time domain, z(t) denotes the wideband transmitted signal in the time domain, i(t) denotes the wideband neighbor cell interference in the time domain and $n^{thermal}(t)$ denotes the wideband thermal noise floor signal in the time domain. It is important to understand that all signal quantities are here given before the pre-equalization step.

Measuring Load after FDPE
Load Definition

To obtain a measure of the load after FDPE interference whitening the RoT after this step is considered. This is in fact more appealing than for the G-rake+ receiver in that the whole uplink load is addressed at the same time. The RoT measure after FDPE processing is given by:

$$RoT^{FDPE}(t) = \frac{z_{pre}^H(t)z_{pre}(t)}{E[(w_{pre}(t)*n^{thermal}(t))^H(w_{pre}(t)*n^{thermal}(t))]} \quad (D3)$$

Computation of the Numerator of (D3)

The numerator of (D3) is straightforward to compute. Noting that the time scale for the RoT measurement in WCDMA is normally a transmission time interval (TTI), it follows that the numerator of (D3) can be computed e.g. by an average of time samples over the TTI of interest (typically 2 ms or 10 ms).

Computation of the Denominator of (D3)

The computation of the denominator of (D3) requires an evaluation of the expectation of that expression. This can be done assuming the thermal noise to be white and stationary, which is a standard assumption. Note that the evolution here therefore is performed over the time interval where the pre-equalization filter remains constant. It then follows that:

$$E[(w_{pre}(t)*n^{thermal}(t))^H(w_{pre}(t)*n^{thermal}(t))] = \quad (D4)$$

$$E\left[\sum_{l_1=0}^{L-1}(n^{thermal}(t-l_1))^H w_{pre}^H(l_1)\sum_{l_2=0}^{L-1}w_{pre}(l_2)n^{thermal}(t-l_2)\right] =$$

$$E\left[\left(\sum_{l_1=0}^{L-1}\sum_{l_2=0}^{L-1}(n^{thermal}(t-l_1))^H w_{pre}^H(l_1)w_{pre}(l_2)n^{thermal}(t-l_2)\right)\right] =$$

$$E\left[\sum_{l_1=0}^{L-1}\sum_{l_2=0}^{L-1}w_{pre}^H(l_1)w_{pre}(l_2)(n^{thermal}(t-l_1))^H n^{thermal}(t-l_2)\right] =$$

$$\sum_{l_1=0}^{L-1}\sum_{l_2=0}^{L-1}w_{pre}^H(l_1)w_{pre}(l_2)E[(n^{thermal}(t-l_1))^H n^{thermal}(t-l_2)]$$

$$\sum_{l_1=0}^{L-1}\sum_{l_2=0}^{L-1}w_{pre}^H(l_1)w_{pre}(l_2)\delta_{l_1 l_2}\sum_{a=1}^{A}\hat{N}_a^{thermal} =$$

$$\left(\sum_{l=0}^{L-1}w_{pre}^H(l)w_{pre}(l)\right)\left(\sum_{a=1}^{A}\hat{N}_a^{thermal}\right).$$

In (D4) $\hat{N}_a^{thermal}$ denotes the estimated thermal noise floor of antenna branch a, before pre-equalization. This means that prior art noise floor estimation algorithms can be re-used. One algorithm is needed for each antenna branch.

Load Estimate
Combining (D3) and (D4) results in:

$$RoT^{FDPE} = \frac{z_{pre}^H(t)z_{pre}(t)}{\left(\sum_{l=0}^{L-1}w_{pre}^H(l)w_{pre}(l)\right)\left(\sum_{a=1}^{A}\hat{N}_a^{thermal}\right)}. \quad (D5)$$

The quantities above should be computed as averages or estimates over a time interval where the whitening filter of the FDOE remains constant. The result is intuitive. Since the total received wideband power is summed over all antenna branches, so is the thermal noise power floor. The RoT after FDPE is also scaled with the power of the pre-whitening filter. An advantage of the FDPE is that the processing is user independent,

APPENDIX E

FDE RoT
The Signal after FDE

Using (B13) and (B15) results in the following equation, where u denotes user U:

$$Z_{FDE,u}(m) = W_u(m)H_u(m)Z(m)+W_u(m)I(m)+W_u(m)N^{thermal}(m). \quad (E1)$$

Here $Z_{FDE,u}(m)$ denotes the pre-equalized wideband signal in the frequency domain, $W_u(m)$ denotes the wideband MMSE equalizing filter in the frequency domain, $H_u(m)$ denotes the wideband net channel response in the frequency domain, Z(m) denotes the wideband transmitted signal in the frequency domain, I(m) denotes the wideband neighbor cell interference in the frequency domain and $N^{thermal}(m)$ denotes the wideband thermal noise floor signal in the frequency domain. All signals are vector valued. The equation (E1) is readily transformed to the time domain with an inverse discrete Fourier transformation, rendering:

$$z_{FDE,u}(t)=(w_u h_u)(t)*z(t)+w_u(t)*i(t)+w_u(t)*n^{thermal}(t) \quad (E2)$$

where the star denotes (multi-dimensional) convolution, $z_{pre,u}(t)$ denotes the equalized wideband signal in the time domain, $w_u(t)$ denotes the wideband finite impulse response of the equalizing filter in the time domain, $h_u(t)$ denotes the wideband finite impulse response net channel response in the time domain, z(t) denotes the wideband transmitted signal in the time domain, i(t) denotes the wideband neighbor cell interference in the time domain and $n^{thermal}(t)$ denotes the wideband thermal noise floor signal in the time domain.

Measuring Load after FDE
Load Definition

To obtain a measure of the load after the FDE interference whitening, the RoT after this step is considered. The RoT measure after FDPE processing is given by:

$$RoT_u^{FDE}(t) = \frac{z_{FDE,u}^H(t)z_{FDE,u}(t)}{E[(w_u(t)*n^{thermal}(t))^H(w_u(t)*n^{thermal}(t))]} \quad (E3)$$

Computation of the Numerator of (E3)

The numerator of (E3) is straightforward to compute. Noting that the time scale for the RoT measurement in WCDMA is normally a transmission time interval (TTI), it follows that the numerator of (E3) can be computed e.g. by an average of time samples over the TTI of interest (typically 2 ms or 10 ms).

Computation of the Denominator of (E3)

The computation of the denominator of (E3) requires an evaluation of the expectation of that expression. This can be done assuming the thermal noise to be white and stationary, which is a standard assumption. Note that the evolution here therefore is performed over the time interval where the pre-equalization filter remains constant. It then follows that:

$$E\left[(w_u(t) * n^{thermal}(t))^H (w_u(t) * n^{thermal}(t))\right] = \quad (E4)$$

$$E\left[\sum_{l_1=0}^{L-1} (n^{thermal}(t-l_1))^H w_u^H(l_1) \sum_{l_2=0}^{L-1} w_u(l_2) n^{thermal}(t-l_2)\right] =$$

$$E\left[\left(\sum_{l_1=0}^{L-1}\sum_{l_2=0}^{L-1} (n^{thermal}(t-l_1))^H w_u^H(l_1) w_u(l_2) n^{thermal}(t-l_2)\right)\right] =$$

$$E\left[\sum_{l_1=0}^{L-1}\sum_{l_2=0}^{L-1} w_u^H(l_1) w_u(l_2) (n^{thermal}(t-l_1))^H n^{thermal}(t-l_2)\right] =$$

$$\sum_{l_1=0}^{L-1}\sum_{l_2=0}^{L-1} w_u^H(l_1) w_u(l_2) E\left[(n^{thermal}(t-l_1))^H n^{thermal}(t-l_2)\right]$$

$$\sum_{l_1=0}^{L-1}\sum_{l_2=0}^{L-1} w_u^H(l_1) w_u(l_2) \delta_{l_1 l_2} \sum_{a=1}^{A} \hat{N}_a^{thermal} =$$

$$\left(\sum_{l=0}^{L-1} w_u^H(l) w_u(l)\right)\left(\sum_{a=1}^{A} \hat{N}_a^{thermal}\right).$$

In (E4) $\hat{N}_a^{thermal}$ denotes the estimated thermal noise floor of antenna branch a, before pre-equalization. This means that prior art noise floor estimation algorithms can be re-used. One algorithm is needed for each antenna branch.

Load Estimate

Combining (E3) and (E4) results in:

$$RoT_u^{FDE} = \frac{z_{FDE,u}^H(t) z_{FDE,u}(t)}{\left(\sum_{l=0}^{L-1} w_u^H(l) w_u(l)\right)\left(\sum_{a=1}^{A} \hat{N}_a^{thermal}\right)}, u = 1, \ldots, U \quad (E5)$$

The quantities above should be computed as averages or estimates over a time interval where the equalizing filter of the FDE remains constant. The result is intuitive. Since the total received wideband power is summed over all antenna branches, so is the thermal noise power floor. The RoT after FDE is also scaled with the power of the equalizing filter.

Combination of Users

The above discussion has focused on a single user. However, what is interesting is a load measure for the complete uplink. Since it is likely that it is the user that experiences the highest load that limits the uplink, the uplink load is defined to be:

$$RoT = \max_u RoT_u^{FDE}, \quad (E6)$$

where $RoT_u^{FDE}$ is the noise rise of user u.

ABBREVIATIONS

3GPP 3rd Generation Partnership Project
AAL2 ATM Adaptation Layer 2
AECID Adaptive Enhanced Cell-ID
A-GPS Assisted Global Positioning System
ARQ Automatic Repeat ReQuest
ATM Asynchronous Transfer Mode
BCH Broadcast CHannel
BCCH Broadcast Control CHannel
CDMA Code Division Multiple Access
CN Core Network
CPICH Common Pilot CHannel
DCH Dedicated Channel
DC-HSDPA Dual-Carrier High-Speed Downlink Packet Access
DPCCH Dedicated. Physical Control CHannel
E-DCH Enhanced Dedicated Channel
E-DPCCH Enhanced-Dedicated Physical Control Channel
E-DPDCH Enhanced-Dedicated Physical Data Channel
E-SMLC Enhanced Serving Mobile Location Center
EUL Enhanced Up Link
E-UTRA Evolved UTRA
FDE Frequency Domain Equalization
FDPE Frequency Domain Pre-Equalization
FFT Fast Fourier Transform
G-rake Generalized RAKE
GSM Global System for Mobile communication
HSDPA High Speed Downlink Packet Access
HSPA High Speed Packet Access
ILPC Inner Loop Power Control
LCS LoCation Services
IC interference Cancellation
IS Interference Suppression
LMU Location Measurement Unit
LTE Long-Term Evolution
MAC Media Access Control
MME Mobility Management Entity
MMSE Minimum Mean Square Error
MSR Multi Standard Radio
OFDM Orthogonal Frequency-Division Multiplexing
O&M Operation and Maintenance
OTDOA Observed Time Difference Of Arrival
PDN Packet Data Network
PSAP Public Safety Answering Point
RAN Radio Access Network
RAT Radio Access Technology
RBS Radio Base Station
RLC Radio Link Control
RNC Radio Network Controller
RNS Radio Network Subsystem
RoT Rise over Thermal
RRC Radio Resource Control
RSCP Received Signal Code Power
RSEPS Received Scheduled Enhanced uplink Power Shared
RSRP Reference Signal Received Power
RSRQ Reference Signal Received. Quality
RSSI Received Signal Strength Indicator
RTT Round Trip Time
RTWP Received Total Wideband Power
SAS Stand-Alone Serving mobile location centre
SINR Signal-to-Interference-and-Noise Ratio
SLC SUPL Location Center
SLP SUPL Location Platform
SON Self Organizing Network
SUPL Secure User Plane Location
TDD Time Division Duplex TDOA Time Difference Of Arrival
TOA Time Of Arrival
TTI Transmission Time interval
UDP User Datagram Protocol
UE User Equipment
UL UpLink
UTDOA Uplink Time Difference Of Arrival
UTRA Universal Terrestrial Radio Access
UTRAN Universal Terrestrial Radio Access Network
WCDMA Wideband Code Division Multiple Access

The invention claimed is:

1. A method, operated in a positioning node, for performing uplink positioning, comprising the steps of:
   receiving a request for uplink positioning of a user equipment;
   obtaining information about carrier capabilities for uplink positioning measurements for said user equipment;
   deciding which carrier to be used for uplink positioning measurements, based at least on said information about carrier capabilities;
   transmitting an uplink positioning measurement request for said user equipment using said carrier decided to be used for uplink positioning measurements; and
   receiving data representing said requested uplink positioning measurements.

2. The method according to claim 1, further comprising issuing a triggering request for enabling said user equipment to utilize said carrier decided to be used for uplink positioning measurements for uplink communication, if said user equipment does not utilize said carrier decided to be used for uplink positioning measurements for uplink communication.

3. The method according to claim 1, further comprising deducing said uplink positioning of said user equipment from said received data representing said requested uplink positioning measurements; and
   reporting said uplink positioning of said user equipment.

4. The method according to claim 1, further comprising:
   receiving data representing a respective load measure for a plurality of cells and carriers available for uplink positioning measurements of said user equipment, said load measures being determined in radio base stations possibly concerned by said uplink positioning;
   said step of deciding being further based on said data representing a respective load measure.

5. The method according to claim 1, wherein said uplink positioning measurement is any one of:
   a time of arrival measurement performed in the uplink,
   a time difference of arrival measurement performed in the uplink,
   a relative time measurement performed in the uplink, and
   a relative time difference measurement performed in the uplink.

6. The method according to claim 1, wherein obtaining information about the carrier capabilities for uplink positioning measurements for said user equipment comprises retrieving said information about carrier capabilities for uplink positioning measurements from a memory.

7. The method according to claim 1, wherein obtaining information about the carrier capabilities for uplink positioning measurements for said user equipment comprises receiving said information about carrier capabilities for the uplink positioning measurements, signaled from location measuring units.

8. The method according to claim 1, wherein said information about carrier capabilities for uplink positioning measurements comprises information about at least one of:
   frequency-related capabilities;
   single-carrier capabilities;
   multi-carrier capabilities; and
   available frequencies for uplink positioning measurements.

9. The method according to claim 2, wherein said triggering request is associated with at least one of the following actions:
   triggering inter-frequency handover,
   switching a carrier,
   configuring simultaneous transmissions on a subset of carriers, and
   changing from/to single-carrier operation for uplink positioning.

10. The method according to claim 2, wherein issuing said triggering request comprises signaling of said triggering request to a node, configured for being allowed to order an enabling for an user equipment to utilize a carrier.

11. The method according to claim 10, wherein said node, configured for being allowed to order an enabling for said user equipment to utilize said carrier, is a base station.

12. The method according to claim 10, wherein said node, configured for being allowed to order an enabling for said user equipment to utilize said carrier, is a radio network controller.

13. The method according to claim 3, wherein reporting said positioning of said user equipment comprises reporting of said positioning as a reference position for an adaptive enhanced cell identification - AECID -positioning method.

14. The method according to claim 13, wherein reporting said positioning of said user equipment is an inter-radio-access-technology reporting, providing said positioning as a reference position for an AECID positioning method for a system with a different access technology system.

15. The method according to claim 4, wherein deciding which carrier to be used for uplink positioning measurements, based at least on said information about carrier capabilities comprises calculating a cost for each cell and carrier combination available for uplink positioning measurements of said user equipment according to a predetermined algorithm responsive to said data representing said load measures and said information about carrier capabilities;
   said deciding which carrier to be used for uplink positioning measurements, based at least on said information about carrier capabilities further comprises selection of a carrier, having most beneficial costs, according to a predetermined criterion, for N cells, as said carrier decided to be used for uplink positioning measurements, where N is a predetermined number, equal or larger than a minimum number of measurements needed to ensure an uplink positioning.

16. The method according to claim 4, wherein said step of deciding is based on a time filtered said data representing a respective load measure.

17. The method according to claim 15, wherein deciding which carrier to be used for uplink positioning measurements, based at least on said information about carrier capabilities further comprises determining of a minimum threshold value for each carrier such that the cost for N cells is lower than said minimum threshold value; said step of selection of a carrier comprises selecting the carrier having a lowest minimum threshold value as said carrier decided to be used for uplink positioning measurements.

18. The method according to claim 15, wherein said calculation of said cost is responsive to at least one of a pathloss between a reference point in a serving cell and the antenna subject to measurements, and an antenna gain of the cell in question relative to the serving cell.

19. The method according to claim 5, wherein said uplink positioning measurement is a measurement for UTDOA positioning.

20. A method, in a node of a radio network subsystem, for assisting in uplink positioning, comprising:
   receiving, from a positioning node, a triggering request for enabling a user equipment to utilize a carrier for uplink communication, said carrier being a carrier decided to be used by the positioning node and selected b the positioning node from a plurality of carriers for uplink positioning measurements; and
   providing an order for enabling said user equipment to utilize said carrier for uplink communication as a response to said triggering request.

21. The method according to claim 20, wherein said node of the radio network subsystem is a radio network controller.

22. The method according to claim 20, wherein said node of the radio network subsystem is a radio base station.

23. The method according to claim 20, wherein said enabling said user equipment to utilize a carrier for uplink communication is at least one of the following actions:
   triggering inter-frequency handover,
   switching a carrier,
   configuring simultaneous transmissions on a subset of carriers, and
   changing from/to single-carrier operation for uplink positioning.

24. A method, in a radio base station, for assisting in uplink positioning, comprising:
   estimating a respective load of a radio interface on carriers configured for communication with user equipments; and
   reporting said respective loads to a positioning node for the positioning node to select one of the carriers for performing uplink positioning measurements.

25. The method according to claim 24, wherein said respective load is a load estimated after interference suppression or interference cancellation.

26. A method, in a location measurement unit, for assisting in uplink positioning, comprising:
   reporting, to a positioning node, which carriers that are supported or available for uplink positioning measurements;
   receiving uplink positioning measurement requests;
   performing said uplink positioning measurements; and
   transmitting uplink positioning measurement reports.

27. A positioning node, comprising:
   a receiver, configured for receiving a request for uplink positioning of a user equipment;
   a capability collector, configured for obtaining information about carrier capabilities for uplink positioning measurements for carriers used in a serving cell of said user equipment;
   a processor, connected to said receiver and said capability collector;
   said processor being configured for deciding which carrier to be used for uplink positioning measurements, based at least on said information about carrier capabilities; and
   a transmitter, connected to said processor, configured for transmitting an uplink positioning measurement request for said user equipment using said carrier decided to be used for uplink measurements; and
   said receiver being further configured for receiving data representing said requested uplink positioning measurements.

28. The positioning node according to claim 27, wherein said processor being further configured for issuing a triggering request for enabling said user equipment to utilize said carrier decided to be used for uplink positioning measurements for uplink communication, if said user equipment does not utilize said carrier decided to be used for uplink positioning measurements for uplink communication.

29. The positioning node according to claim 27, wherein
   said processor being further configured for deducing said uplink positioning of said user equipment from said received data representing said requested uplink positioning measurements;
   said transmitter being further configured for reporting said uplink positioning of said user equipment.

30. The positioning node according to claim 27, wherein
   said receiver is further configured for receiving data representing a respective load measure for a plurality of cells and carriers available for uplink positioning measurements of said user equipment, said load measures being determined in base stations possibly concerned by said uplink positioning;
   said processor is further configured for performing said deciding further based on said data representing a respective load measure.

31. The positioning node according to claim 27, wherein said uplink positioning measurement is any one of:
   a time of arrival measurement performed in the uplink,
   a time difference of arrival measurement performed in the uplink,
   a relative time measurement performed in the uplink, and
   a relative time difference measurement performed in the uplink.

32. The positioning node according to claim 27, wherein said capability collector comprises a memory for retrieving said information about carrier capabilities for uplink positioning measurements.

33. The positioning node according to claim 27, wherein said capability collector is constituted by said receiver, being further configured for receiving said information about carrier capabilities for uplink positioning measurements, signaled from location measuring units.

34. The positioning node according to claim 27, wherein said information about carrier capabilities for uplink positioning measurements comprises information about at least one of:
   frequency-related capabilities;
   single-carrier capabilities;
   multi-carrier capabilities; and
   available frequencies for uplink positioning measurements.

35. The positioning node according to claim 27, wherein said transmitter being further configured for reporting said positioning as a reference position for an adaptive enhanced cell identification - AECID - positioning method.

36. The positioning node according to claim 28, wherein said transmitter is further configured for signaling said triggering request to a node, configured for being allowed to order an enabling for a user equipment to utilize a carrier.

37. The positioning node according to claim 36, wherein said node, configured for being allowed to order an enabling for said user equipment to utilize said carrier, is a base station.

38. The positioning node according to claim 36, wherein said node, configured for being allowed to order an enabling for said user equipment to utilize said carrier, is a radio network controller.

39. The positioning node according to claim 31, wherein said uplink positioning measurement is a measurement for UTDOA positioning.

40. A radio base station, comprising:
an antenna, configured for communication with user equipments;
a load estimator, configured to estimate a respective load of a radio interface on said at least two carriers; and
a transmitter, connected to said load estimator, configured for reporting said respective loads to a positioning node for the positioning node to determine one of the carriers for uplink positioning measurement.

41. The radio base station according to claim 40, wherein said respective load is a load estimated after interference suppression or interference cancellation.

42. A location measurement unit, comprising:
an antenna, configured for reception of radio signals;
a measurement unit, connected to said antenna, said measurement unit being configured for uplink positioning measurements on said radio signals;
a communication unit, connected to said measurement unit, said communication unit being configured for receiving uplink positioning measurement requests and for transmitting uplink positioning measurement reports;
said communication unit being further configured for reporting which carriers that are supported or available for uplink positioning measurements, to a positioning node.

43. A node of a radio network subsystem, comprising:
a carrier selector, configured for providing an order for enabling a user equipment to utilize a carrier for uplink communication with a radio base station;
said carrier selector being further configured for receiving, from a positioning node, a triggering request for enabling a user equipment to utilize a carrier for uplink communication, said carrier being a carrier decided to be used for uplink positioning measurements by the positioning node and selected from a plurality of carriers by the positioning node;
said carrier selector being further configured for providing said order for enabling said user equipment to utilize said carrier for uplink communication as a response on a received said triggering request.

44. The node according to claim 43, wherein said node is a radio network controller.

45. The node according to claim 43, wherein said node is a radio base station.

46. A cellular communication system, comprising:
at least one first node comprising:
a receiver, configured for receiving a request for uplink positioning of a user equipment;
a capability collector, configured for obtaining information about carrier capabilities for uplink positioning measurements for carriers used in a serving cell of said user equipment;
a processor, connected to said receiver and said capability collector;
said processor being configured for deciding which carrier to be used for uplink positioning measurements, based at least on said information about carrier capabilities;
a transmitter, connected to said processor, configured for transmitting an uplink positioning measurement request for said user equipment using said carrier decided to be used for uplink measurements;
said receiver being further configured for receiving data representing said requested uplink positioning measurements; and
at least one second node comprising:
a carrier selector, configured for providing an order for enabling said user equipment to utilize a carrier for uplink communication with a radio base station;
said carrier selector being further configured for receiving, from a positioning node, a triggering request for enabling said user equipment to utilize a carrier for uplink communication, said carrier being a carrier decided to be used for uplink positioning measurements;
said carrier selector being further configured for providing said order for enabling said user equipment to utilize said carrier for uplink communication as a response on a received said triggering request.

47. The cellular communication system according to claim 46, wherein said cellular communication system is based on at least one radio access technology of:
WCDMA,
HSPA,
GSM,
UMTS TDD,
LTE,
LTE-Advanced,
cdma2000,
WiFi, and
WiMAX.

* * * * *